United States Patent
Motaparti et al.

(10) Patent No.: US 9,798,717 B2
(45) Date of Patent: Oct. 24, 2017

(54) HUMAN-TO-MOBILE INTERFACES

(75) Inventors: Sunil Motaparti, Glasgow (GB); Sanjay Patel, Thornton Heath (GB)

(73) Assignee: Keypoint Technologies (UK) Limited (GB)

( * ) Notice: Subject to any disclaimer, the term of this patent is extended or adjusted under 35 U.S.C. 154(b) by 1741 days.

(21) Appl. No.: 11/887,019

(22) PCT Filed: Mar. 23, 2006

(86) PCT No.: PCT/GB2006/001090
§ 371 (c)(1),
(2), (4) Date: Mar. 17, 2008

(87) PCT Pub. No.: WO2006/100505
PCT Pub. Date: Sep. 28, 2006

(65) Prior Publication Data
US 2009/0055732 A1    Feb. 26, 2009

(30) Foreign Application Priority Data

Mar. 23, 2005   (GB) .................................. 0505942.3

(51) Int. Cl.
*G06F 17/00* (2006.01)
*G06F 17/27* (2006.01)
*G06F 3/023* (2006.01)

(52) U.S. Cl.
CPC .......... *G06F 17/276* (2013.01); *G06F 3/0237* (2013.01); *G06F 17/273* (2013.01); *G06F 17/2735* (2013.01); *G06F 17/2765* (2013.01)

(58) Field of Classification Search
CPC .... G06F 3/0237; G06F 17/276; G06F 17/273; G06F 17/2735; G06F 17/2765
(Continued)

(56) References Cited

U.S. PATENT DOCUMENTS 3,226,712 A    12/1965  Lens et al. .................... 341/22
3,557,927 A     1/1971  Wright .......................... 400/94
(Continued)

FOREIGN PATENT DOCUMENTS

AU    2004200059    7/2005
CA    2 454 028     6/2005
(Continued)

OTHER PUBLICATIONS

Hasselgren et al. "HMS: A Predictive Text Entry Method Using Bigrams." *TextEntry '03: Proceedings of the 2003 EACL Workshop on Language Modeling for Text Entry Methods*, (2003): pp. 43-49.
(Continued)

*Primary Examiner* — Cesar Paula
*Assistant Examiner* — David Faber
(74) *Attorney, Agent, or Firm* — Brinks Gilson & Lione

(57) ABSTRACT

A method of character recognition for a mobile telephone having a plurality of data input keys. The method facilitates a reduction in the number of user interactions required to create a given data string to less than the number of characters within the data string. The method includes: storing a set of data strings each with a priority indicator; recognizing an event; looking up the most likely subsequent data string to follow the event from the set of data strings; and ordering the data strings for display based on the priority indicator of that data string. If included in the list, the required subsequent data string is selected. If not included in the list, an event is entered and the steps of recognizing the event, looking up and ordering data strings are repeated. The priority indicator of the selected data string and the set of data strings are updated.

27 Claims, 17 Drawing Sheets

(58) Field of Classification Search
USPC .................. 715/256, 257, 259–261, 271
See application file for complete search history.

(56) References Cited

U.S. PATENT DOCUMENTS

| | | | |
|---|---|---|---|
| 3,648,245 A | 3/1972 | Dodds, Jr. et al. | |
| 3,929,216 A | 12/1975 | Einbinder | 400/484 |
| 3,940,758 A | 2/1976 | Margolin | 345/169 |
| 4,459,049 A | 7/1984 | Howell | 400/98 |
| 4,483,634 A | 11/1984 | Frey et al. | 400/489 |
| 4,824,268 A | 4/1989 | Diernisse | 400/486 |
| 4,931,935 A | 6/1990 | Ohira et al. | |
| 5,017,030 A | 5/1991 | Crews | 400/485 |
| 5,031,206 A | 7/1991 | Riskin | |
| 5,073,050 A | 12/1991 | Andrews | 400/82 |
| 5,122,786 A | 6/1992 | Rader | 345/168 |
| 5,137,384 A | 8/1992 | Spencer et al. | 400/489 |
| 5,178,477 A | 1/1993 | Gambaro | 400/489 |
| 5,187,644 A | 2/1993 | Crisan | 361/679.16 |
| 5,210,689 A | 5/1993 | Baker et al. | 704/1 |
| 5,318,367 A | 6/1994 | Braun et al. | 400/82 |
| 5,332,322 A | 7/1994 | Gambaro | 400/489 |
| 5,360,280 A | 11/1994 | Camacho et al. | 400/489 |
| 5,372,441 A | 12/1994 | Louis | 400/489 |
| 5,397,189 A | 3/1995 | Minogue | 400/489 |
| 5,426,449 A | 6/1995 | Danziger | 345/168 |
| 5,503,484 A | 4/1996 | Louis | 400/489 |
| 5,543,790 A | 8/1996 | Goldstein | 341/22 |
| 5,553,953 A | 9/1996 | Herman et al. | 400/489 |
| 5,610,602 A | 3/1997 | Hargreaves | 341/22 |
| 5,612,691 A | 3/1997 | Murmann et al. | 341/22 |
| 5,620,267 A | 4/1997 | Klauber | 400/489 |
| 5,660,488 A | 8/1997 | Miller | 400/486 |
| 5,673,040 A | 9/1997 | Hargreaves et al. | 341/22 |
| 5,680,511 A | 10/1997 | Baker et al. | |
| 5,689,253 A | 11/1997 | Hargreaves et al. | 341/22 |
| 5,716,149 A | 2/1998 | Mensick | 400/489 |
| 5,731,808 A | 3/1998 | Gaither | 345/168 |
| 5,775,822 A | 7/1998 | Cheng | 400/489 |
| 5,788,195 A | 8/1998 | Rice | 248/118.5 |
| 5,788,386 A | 8/1998 | Hayashi et al. | 400/489 |
| 5,790,103 A | 8/1998 | Willner | 345/168 |
| 5,805,911 A * | 9/1998 | Miller | G06F 17/276 715/234 |
| 5,818,437 A | 10/1998 | Grover et al. | 715/811 |
| 5,828,323 A | 10/1998 | Bartet | 341/22 |
| 5,829,000 A | 10/1998 | Huang | 704/252 |
| 5,896,321 A | 4/1999 | Miller et al. | |
| 5,952,942 A * | 9/1999 | Balakrishnan | G06F 3/0237 341/20 |
| 5,959,629 A | 9/1999 | Masui | |
| 5,959,948 A | 9/1999 | Oshima | |
| 5,971,636 A | 10/1999 | Mensick | 400/489 |
| 5,995,084 A | 11/1999 | Chan | 345/173 |
| 6,005,495 A | 12/1999 | Connolly et al. | 341/22 |
| 6,005,496 A | 12/1999 | Hargreaves et al. | 341/22 |
| 6,011,495 A | 1/2000 | Chen | 341/22 |
| 6,022,156 A | 2/2000 | Blish | 400/472 |
| 6,031,469 A | 2/2000 | Dodd | 341/22 |
| 6,084,576 A | 7/2000 | Leu et al. | 345/168 |
| 6,088,022 A | 7/2000 | Rakoski | 345/168 |
| 6,114,977 A | 9/2000 | Smith et al. | 341/22 |
| 6,132,118 A | 10/2000 | Grezeszak | 400/489 |
| 6,147,673 A | 11/2000 | Zarek | 345/156 |
| 6,198,474 B1 | 3/2001 | Roylance | 345/168 |
| 6,204,848 B1 | 3/2001 | Nowlan et al. | 715/810 |
| 6,224,279 B1 | 5/2001 | Nielsen et al. | 400/495 |
| 6,286,064 B1 | 9/2001 | King et al. | 710/67 |
| 6,573,844 B1 | 6/2003 | Venolia et al. | |
| 6,616,703 B1 * | 9/2003 | Nakagawa | G06F 17/273 704/10 |
| 6,712,534 B2 | 3/2004 | Patel | 400/486 |
| 6,801,190 B1 | 10/2004 | Robinson et al. | 345/173 |
| 7,124,080 B2 | 10/2006 | Chen et al. | |
| 7,165,019 B1 | 1/2007 | Lee et al. | |
| 7,296,229 B2 | 11/2007 | Berstis | |
| 7,475,343 B1 | 1/2009 | Mielenhausen | |
| 7,503,001 B1 | 3/2009 | Lekutai | 715/261 |
| 7,912,706 B2 * | 3/2011 | Sparre | G06F 17/276 704/10 |
| 7,953,692 B2 * | 5/2011 | Bower | G06F 17/276 706/18 |
| 8,036,878 B2 * | 10/2011 | Assadollahi | G06F 3/0237 704/10 |
| 8,073,835 B2 * | 12/2011 | Lowles | G06F 1/1626 707/711 |
| 8,188,978 B2 * | 5/2012 | Fux | G06F 3/0237 345/169 |
| 8,713,432 B2 * | 4/2014 | Assadollahi | G06F 3/0237 715/257 |
| 8,930,181 B2 * | 1/2015 | Parikh | G06F 17/276 704/255 |
| 9,020,935 B2 * | 4/2015 | Lowles | G06F 1/1626 707/708 |
| 9,274,551 B2 * | 3/2016 | Su | G06F 1/1616 |
| 2001/0009009 A1 | 7/2001 | Lizuka | |
| 2002/0038207 A1 | 3/2002 | Mori et al. | |
| 2002/0186883 A1 | 12/2002 | Roman | |
| 2003/0011574 A1 | 1/2003 | Goodman | |
| 2003/0016985 A1 | 1/2003 | Patel | |
| 2003/0017844 A1 * | 1/2003 | Yu | G06F 3/0237 455/556.1 |
| 2003/0023420 A1 | 1/2003 | Goodman | |
| 2003/0093263 A1 | 5/2003 | Chen et al. | |
| 2003/0104839 A1 | 6/2003 | Kraft et al. | 455/566 |
| 2003/0195904 A1 | 10/2003 | Chestnut et al. | |
| 2003/0197736 A1 | 10/2003 | Murphy | 715/780 |
| 2004/0021691 A1 * | 2/2004 | Dostie | G06F 3/0237 715/773 |
| 2004/0140956 A1 | 7/2004 | Kushler et al. | 345/168 |
| 2004/0153975 A1 | 8/2004 | Williams et al. | |
| 2004/0169635 A1 | 9/2004 | Ghassabian | 345/156 |
| 2004/0201607 A1 * | 10/2004 | Mulvey et al. | 345/708 |
| 2005/0017954 A1 | 1/2005 | Kay et al. | |
| 2005/0114770 A1 | 5/2005 | Sacher et al. | |
| 2005/0192792 A1 * | 9/2005 | Carus | G06F 17/2735 704/2 |
| 2005/0210020 A1 * | 9/2005 | Gunn | G06F 3/0237 |
| 2005/0210402 A1 | 9/2005 | Gunn et al. | |
| 2005/0246365 A1 * | 11/2005 | Lowles | G06F 1/1626 |
| 2006/0156233 A1 * | 7/2006 | Nurmi | G06F 17/276 715/259 |
| 2006/0265208 A1 | 11/2006 | Assadollahi | |
| 2007/0040813 A1 * | 2/2007 | Kushler | G06F 3/0237 345/173 |
| 2007/0061301 A1 * | 3/2007 | Ramer | G06F 17/30867 |
| 2007/0216651 A1 | 9/2007 | Patel | 345/168 |
| 2007/0233463 A1 * | 10/2007 | Sparre | G06F 17/276 704/10 |
| 2008/0266263 A1 | 10/2008 | Motaparti et al. | 345/169 |
| 2008/0313182 A1 * | 12/2008 | Vasa | G06F 3/023 |
| 2009/0055732 A1 | 2/2009 | Motaparti et al. | |
| 2009/0150322 A1 * | 6/2009 | Bower | G06F 17/276 706/50 |

FOREIGN PATENT DOCUMENTS

| | | |
|---|---|---|
| CA | 2561218 | 10/2005 |
| CA | 2601303 | 9/2006 |
| CA | 2601305 | 9/2006 |
| DE | 34 09 980 | 9/1985 |
| DE | 43 04 470 | 8/1994 |
| DE | 4304470 | 8/1994 |
| EP | 0 538 329 | 1/1992 |
| EP | 0 768 598 | 4/1997 |
| EP | 0 810 513 | 12/1997 |
| FR | 2 655 911 | 6/1991 |
| FR | 2655911 | 6/1991 |
| GB | 2 154 948 | 9/1985 |
| GB | 2 378 420 | 2/2003 |
| WO | WO 92/00851 | 1/1992 |
| WO | WO 98/33111 | 7/1998 |

(56) References Cited

FOREIGN PATENT DOCUMENTS

| WO | WO 01/27732 | 4/2001 |
|---|---|---|
| WO | WO 2001/027732 | 4/2001 |
| WO | WO 03/060451 | 7/2003 |
| WO | WO 2004/010323 A2 | 1/2004 |
| WO | WO 2004010323 A2 * | 1/2004 |
| WO | WO 2005/093555 | 10/2005 |
| WO | WO 2006/100505 | 9/2006 |
| WO | WO 2006/100509 | 9/2006 |

OTHER PUBLICATIONS

Hobday SW. A keyboard to increase productivity and reduce procedural stress, Paper Presented at the Annual International Industrial Ergonomics and Safety Conference, Jun. 8-10, 1998 (9 pages) (1988).
Stocky, et al. A commonsense approach to predictive text entry, CHI'04: CHI'04 Extended Abstracts on Human Factors in Computing Systems (4 pages) (2004).
Preliminary Amendment filed Sep. 22, 2006 with the USPTO for U.S. Appl. No. 10/593,833, filed Sep. 22, 2006 (1st Named Inventor—Patel) (14 pages).
Requirement for Restriction/Election mailed Oct. 23, 2010 by the USPTO for U.S. Appl. No. 10/593,833, filed Sep. 22, 2006 (1st Named Inventor—Patel) (5 pages).
Response to Requirement for Restriction/Election filed Feb. 22, 2011 with the USPTO for U.S. Appl. No. 10/593,833, filed Sep. 22, 2006 (1st Named Inventor—Patel) (2 pages).
Non-final Rejection mailed Apr. 27, 2011 by the USPTO for U.S. Appl. No. 10/593,833, filed Sep. 22, 2006 (1st Named Inventor—Patel) (19 pages).
Response to Non-final Rejection filed Aug. 23, 2011 with the USPTO for U.S. Appl. No. 10/593,833, filed Sep. 22, 2006 (1st Named Inventor—Patel) (13 pages).
Final Rejection mailed Nov. 10, 2011 by the USPTO for U.S. Appl. No. 10/593,833, filed Sep. 22, 2006 (1st Named Inventor—Patel) (18 pages).
Amendment after Final Rejection filed Jan. 6, 2012 with the USPTO for U.S. Appl. No. 10/593,833, filed Sep. 22, 2006 (1st Named Inventor—Patel) (11 pages).
Applicant-initiated Interview Summary filed Feb. 16, 2012 with the USPTO for U.S. Appl. No. 10/593,833, filed Sep. 22, 2006 (1st Named Inventor—Patel) (3 pages).
Non-final Rejection mailed Mar. 30, 2012 by the USPTO for U.S. Appl. No. 10/593,833, filed Sep. 22, 2006 (1st Named Inventor—Patel) (16 pages).
International Search Report issued by the International Searching Authority on Mar. 5, 2007 for PCT/GB2006/001097 filed on Mar. 23, 2006 and published as WO/2006/100509 on Sep. 28, 2006 (Applicant—Keypoint Technologies // 1st Named Inventor—Motaparti) (3 pages).
Preliminary Amendment filed Sep. 24, 2007 with the USPTO for U.S. Appl. No. 11/887,023, filed Mar. 17, 2008 (1st Named Inventor—Motaparti) (12 pages).
Non-final Rejection mailed Mar. 14, 2011 by the USPTO for U.S. Appl. No. 11/887,023, filed Mar. 17, 2008 (1st Named Inventor—Motaparti) (18 pages).
Response to Non-final Rejection filed Aug. 9, 2011 with the USPTO for U.S. Appl. No. 11/887,023, filed Mar. 17, 2008 (1st Named Inventor—Motaparti) (15 pages).
Final Rejection mailed Nov. 16, 2011 by the USPTO for U.S. Appl. No. 11/887,023, filed Mar. 17, 2008 (1st Named Inventor—Motaparti) (20 pages).
Amendment after Final Rejection filed Mar. 15, 2012 with the USPTO for U.S. Appl. No. 11/887,023, filed Mar. 17, 2008 (1st Named Inventor—Motaparti) (14 pages).
Examination Report issued Dec. 18, 2008 by the Intellectual Property Office of New Zealand for patent application No. NZ 549779 filed Mar. 23, 2005 (Applicant—Keypoint Technologies // 1st Named Inventor—Patel) (2 pages).
Examination Report issued Nov. 26, 2008 by the Intellectual Property Office of New Zealand for patent application No. NZ 549779 filed Mar. 23, 2005 (Applicant—Keypoint Technologies // 1st Named Inventor—Patel) (2 pages).
Examination Report issued May 22, 2007 by the Intellectual Property Office of New Zealand for patent application No. NZ 549779 filed Mar. 23, 2005 (Applicant—Keypoint Technologies // 1st Named Inventor—Patel) (2 pages).
Written Opinion issued Nov. 7, 2005 by the International Searching Authority for PCT/GB2005/001111 filed Mar. 23, 2005 and published as WO/2005/093555 on Oct. 6, 2005 (Applicant—Keypoint Technologies // 1st Named Inventor—Patel) (5 pages).
International Preliminary Report on Patentability issued Sep. 26, 2006 by the International Bureau for PCT/GB2006/001111 filed Mar. 23, 2005 and published as WO/2005/093555 on Oct. 6, 2005 (Applicant—Keypoint Technologies // 1st Named Inventor—Patel) (6 pages).
International Preliminary Report on Patentability issued Jul. 26, 2007 by the International Bureau for PCT/GB2006/00197 filed Mar. 23, 2006 and published as WO/2006/100509 on Sep. 28, 2006 (Applicant—Keypoint Technologies // 1st Named Inventor—Motaparti) (16 pages).
International Preliminary Report on Patentability issued Jul. 26, 2007 by the International Bureau for PCT/GB2006/001090 filed Mar. 23, 2006 and published as WO/2006/100505 on Sep. 28, 2006 (Applicant—Keypoint Technologies // 1st Named Inventor—Motaparti) (14 pages).
"Associative array," Wikipedia, Feb. 24, 2004, downloaded Nov. 27, 2012 from http://en.wikipedia.org/w/index.php?title=Associative_array&oldid=2823416 (pp. 1-4).
Amendment and Response to Office Action filed Sep. 25, 2012 to the United States Patent and Trademark Office for U.S. Appl. No. 10/593,833, filed Sep. 22, 2006 (Applicant—Keypoint Technologies // Inventor—Patel) (pp. 1-11).
Final Rejection issued Oct. 12, 2012 by the United States Patent and Trademark Office for U.S. Appl. No. 10/593,833, filed Sep. 22, 2006 (Applicant—Keypoint Technologies // Inventor—Patel) (pp. 1-16).
Response to Notice of Non-Compliant Amendment filed Oct. 1, 2012 to the United States Patent and Trademark Office for U.S. Appl. No. 10/593,833, filed Sep. 22, 2006 (Applicant—Keypoint Technologies // Inventor—Patel) (pp. 1-12).
Non-Final Rejection issued Dec. 6, 2012 by the United States Patent and Trademark Office for U.S. Appl. No. 11/887,023, filed Mar. 17, 2008 (Applicant—Keypoint Technologies // Inventor—Motaparti, et al.;) (pp. 1-15).
International Search Report issued Sep. 23, 2007 by the International Searching Authority for PCT/GB2006/001090 filed Mar. 23, 2006 and published as WO/2006/100505 on Sep. 28, 2006 (Applicant—Keypoint Technologies // Inventor—Motaparti) (pp. 1-4).
Written Opinion issued Sep. 23, 2007 by the International Searching Authority for PCT/GB2006/001090 filed Mar. 23, 2006 and published as WO/2006/100505 on Sep. 28, 2006 (Applicant—Keypoint Technologies // Inventor—Motaparti) (pp. 1-11).
Written Opinion issued Sep. 23, 2007 by the International Searching Authority for PCT/GB2006/001097 filed on Mar. 23, 2006 and published as WO/2006/100509 on Sep. 28, 2006 (Applicant—Keypoint Technologies // Inventor—Motaparti) (pp. 1-11).
Intention to grant patent issued Jan. 23, 2013 by the European Patent Office for European Patent Application No. 05729287.2 (European Publication No. 1733298) filed Mar. 23, 2005 (Applicant—Keypoint Technologies // Inventor—Patel) (pp. 1-137).
Minutes of the Oral Proceeding issued Dec. 18, 2012 by the European Patent Office for European Patent Application No. 05729287.2 (European Publication No. 1733298) filed Mar. 23, 2005 (Applicant—Keypoint Technologies // Inventor—Patel) (pp. 1-16).
Koltringer, et al. Comparing the immediate usability of Graffiti 2 and Virtual Keyboard. Research Industrial Software Engineering, Vienna University of Technology. CHI'04: CHI'04 Extended Abstracts on Human Factors in Computing Systems, 2004 (4 pages).

(56) References Cited

OTHER PUBLICATIONS

Burgess and Lund. Modelling Parsing Constraints with High-dimensional Context Space. Language and Cognitive Processes, 1997, 12(2/3), 177-210, (18 pages).
C. E. Shannon. A Mathematical Theory of Communication. The Bell System Technical Journal, vol. 27, pp. 379-423, 623-656, Jul.-Oct. 1948, (55 pages).
Office Action dated Feb. 2, 2009 by the Intellectual Property Office of Singapore for Singapore Patent Application No. 200606600-5 filed Mar. 23, 2005 (Applicant—Keypoint Technologies // 1st Named Inventor—Patel) (5 pages).
Office Action issued Mar. 18, 2009 by the Russian Patent Office for Russian Patent Application No. 2006133906/09(036880) entered into national stage on Sep. 22, 2006 from PCT/GB2005/001111 filed on Mar. 23, 2005 (Applicant—Keypoint Technologies // 1st Named Inventor—Patel) (both Russian language Office Action and English translation are provided) (7 pages).
International Search Report issued Nov. 9, 2005 by the International Searching Authority for PCT/GB2005/001111 filed Mar. 23, 2005 and published as WO/2005/093555 on Oct. 6, 2005 (Applicant—Keypoint Technologies // 1st Named Inventor—Patel) (2 pages).
Claims Amendment filed Dec. 12, 2006 with the European Patent Office for European Patent Application No. 05729287.2 (European Publication No. 1733298) filed Mar. 23, 2005 (Applicant—Keypoint Technologies // 1st Named Inventor—Patel) (3 pages).
Notice of Loss of Rights issued Feb. 5, 2007 by the European Patent Office for European Patent Application No. 05729287.2 (European Publication No. 1733298) filed Mar. 23, 2005 (Applicant—Keypoint Technologies // 1st Named Inventor—Patel) (1 page).
Telephone Interview Summary issued Feb. 6, 2007 by the European Patent Office for European Patent Application No. 05729287.2 (European Publication No. 1733298) filed Mar. 23, 2005 (Applicant—Keypoint Technologies // 1st Named Inventor—Patel) (1 page).
Communication from the Examining Division issued Sep. 28, 2009 by the European Patent Office for European Patent Application No. 05729287.2 (European Publication No. 1733298) filed Mar. 23, 2005 (Applicant—Keypoint Technologies // 1st Named Inventor—Patel) (5 pages).
Reply to Communication from the Examining Division filed Apr. 8, 2010 to the European Patent Office for European Patent Application No. 05729287.2 (European Publication No. 1733298) filed Mar. 23, 2005 (Applicant—Keypoint Technologies // 1st Named Inventor—Patel) (19 pages).
Acknowledgement of a document and Preparation and Summons for Oral Proceedings dated May 3, 2012 by the European Patent Office for European Patent Application No. 05729287.2 (European Publication No. 1733298) filed Mar. 23, 2005 (Applicant—Keypoint Technologies // 1st Named Inventor—Patel) (8 pages).
Submission in Preparation to Oral Proceedings dated Aug. 17, 2012 to the European Patent Office for European Patent Application No. 05729287.2 (European Publication No. 1733298) filed Mar. 23, 2005 (Applicant—Keypoint Technologies // 1st Named Inventor—Patel) (18 pages).
Findings upon Submissions relating to Oral Proceedings dated Aug. 20, 2012 by the European Patent Office for European Patent Application No. 05729287.2 (European Publication No. 1733298) filed Mar. 23, 2005 (Applicant—Keypoint Technologies // 1st Named Inventor—Patel) (2 pages).
Communication from the Examining Division issued Apr. 27, 2010 by the European Patent Office for European Patent Application No. 06726508.2 (European Publication No. 1861769) filed Mar. 23, 2006 (Applicant—Keypoint Technologies // 1st Named Inventor—Motaparti) (3 pages).
Notice that application deemed to be withdrawn issued Dec. 14, 2010 by the European Patent Office for European Patent Application No. 06726508.2 (European Publication No. 1861769) filed Mar. 23, 2006 (Applicant—Keypoint Technologies // 1st Named Inventor—Motaparti) (1 page).

Request for Further Processing dated Feb. 23, 2011 submitted to the European Patent Office for European Patent Application No. 06726508.2 (European Publication No. 1861769) filed Mar. 23, 2006 (Applicant—Keypoint Technologies // 1st Named Inventor—Motaparti) (22 pages).
Decision to Allow Further Processing issued Mar. 9, 2011 by the European Patent Office for European Patent Application No. 06726508.2 (European Publication No. 1861769) filed Mar. 23, 2006 (Applicant—Keypoint Technologies // 1st Named Inventor—Motaparti) (1 page).
Communication from the Examining Division issued Apr. 27, 2010 by the European Patent Office for European Patent Application No. 06726503.3 (European Publication No. 1861768) filed Mar. 23, 2006 (Applicant—Keypoint Technologies // 1st Named Inventor—Motaparti) (3 pages).
Notice that application deemed to be withdrawn issued Dec. 14, 2010 by the European Patent Office for European Patent Application No. 06726503.3 (European Publication No. 1861768) filed Mar. 23, 2006 (Applicant—Keypoint Technologies // 1st Named Inventor—Motaparti) (1 page).
Request for Further Processing dated Feb. 23, 2011 with the European Patent Office for European Patent Application No. 06726503.3 (European Publication No. 1861768) filed Mar. 23, 2006 (Applicant—Keypoint Technologies // 1st Named Inventor—Motaparti) (21 pages).
Decision to Allow Further Processing issued Mar. 9, 2011 by the European Patent Office for European Patent Application No. 06726503.3 (European Publication No. 1861768) filed Mar. 23, 2006 (Applicant—Keypoint Technologies // 1st Named Inventor—Motaparti) (1 page).
Russian Office Action issued Mar. 18, 2009 by the Russian Office for Russian Patent Application No. 2006133906/09 (036880) filed Mar. 23, 2005 (Applicant—Keypoint Technologies; Inventor—Patel) (pp. 1-7).
U.S. Patent and Trademark Office, Office Action for U.S. Appl. No. 11/887,023 dated Oct. 18, 2016, 17 pages.
Kenneth Ward Church et al., "Word Association Norms, Mutual Information, and Lexicography" Computation Linguistics, vol. 16, No. 1, Mar. 1990, pp. 22-29.
Claims Amendment filed Dec. 12, 2006 with the European Patent Office for EP 1 733 298 filed Mar. 23, 2005 (Applicant—Keypoint Technologies // 1st Named Inventor—Patel), 3 pages.
Communication pursuant to Rule 71(3) EPC issued Jan. 23, 2013 by the European Patent Office for European Patent Application No. 05729287.2 (European Publication No. 1733298) filed Mar. 23, 2005 (Applicant—Keypoint Technologies // Inventor—Patel), 5 pages.
Copy of International Searh Report and Written Opinion for PCT/GB2006/001090 dated Mar. 5, 2007, 17 pages.
International Search Report issued Nov. 9, 2005 by the International Searching Authority for PCT/GB2005/001111 filed Mar. 23, 2005 and published as WO 2005/093555 on Oct. 06, 2005 (Applicant—Keypoint Technologies // 1st Named Inventor—Patel), 2 pages.
Non-Final Rejection issued on Apr. 27, 2011 for U.S. Appl. No. 10/593,833 filed on Sep. 22, 2006, (Inventor Patel et al.) 19 pages.
Notice of Allowance dated Dec. 15, 2015 for Canadian Patent Application No. 2,601,305, 1 p.
Office Action dated Feb. 3, 2015 for Canadian Patent Application No. 2,561,218, 8 pages.
Office Action dated Feb. 15, 2014 for Indian Patent Application No. 5300/DELNP/2006, 2 pages.
Office Action dated May 12, 2015 for Indian Patent Application No. 7606/DELNP/2007, 3 pages.
Office Action dated May 26, 2015 for Indian Patent Application No. 7608/DELNP/2007, 3 pages.
Office Action dated Nov. 3, 2015 for Canadian Patent Application No. 2,601,303, 2 pages.
Office Action dated Oct. 8, 2014 for Canadian Patent Application No. 2,601,305, 5 pages.
Plew, Ronald et al., "The Database Normalization Process," informIT, Jan. 24, 2003, 9 pages.
Response to Official Action dated Apr. 8, 2015 for Canadian Patent Application No. 2,601,305, 8 pages.

(56) References Cited

OTHER PUBLICATIONS

Response to Official Action filed Jul. 31, 2015 for Canadian Patent Application No. 2,561,218, 6 pages.
Response to Office Action filed Sep. 22, 2014 for Indian Patent Application No. 5300/DELNP/2006, 10 pages.
Gorokhov, "Radio electronics glossary," Moscow, "Russian Language," D3, 1993, cover and pp. 180-181, including English translation.
Office Action issued Mar. 18, 2009 by the Russian Patent Office for Russian Patent Application No. 2006133906/09, entered into national stage on Sep. 22, 2006 from PCT/GB2005/001111 filed on Mar. 23, 2005 (Applicant—Keypoint Technologies // 1st Named Inventor—Patel) (both Russian language office action (pp. 5-7) and the Enlish translation (pp. 1-4) are provided), 7 pages.

* cited by examiner

Fig. 2

To type the following SMS message "Dear Friend, Please call me as soon as possible to fix a date for another meeting" requires extensive and repetitive keying as depicted below. Upper casing of letters (Key *x3=3), general punctuation (Key 1x2=2) and spacing between words (Key #x15=15) accounts for an additional +20 key presses in the example below.

| Word: | Key x Presses (letter obtained) | | | | | | |
|---|---|---|---|---|---|---|---|
| Dear | 3 x 1 (D) | 3 x 2 (e) | 2 x 1 (a) | 7 x 3 (r) | | | |
| Friend | 3 x 3 (F) | 7 x 3 (r) | 4 x 3 (i) | 3 x 2 (e) | 6 x 2 (n) | 3 x 1 (d) | |
| Please | 7 x 1 (P) | 5 x 3 (l) | 3 x 2 (e) | 2 x 1 (a) | 7 x 4 (s) | 3 x 2 (e) | |
| call | 2 x 3 (c) | 2 x 1 (a) | 5 x 3 (l) | 5 x 3 (l) | | | |
| me | 6 x 1 (m) | 3 x 2 (e) | | | | | |
| as | 2 x 1 (a) | 7 x 4 (s) | | | | | |
| soon | 7 x 4 (s) | 6 x 3 (o) | 6 x 3 (o) | 6 x 2 (n) | | | |
| as | 2 x 1 (a) | 7 x 4 (s) | | | | | |
| possible | 7 x 1 (p) | 6 x 3 (o) | 7 x 4 (s) | 7 x 4 (s) | 4 x 3 (i) | 2 x 2 (b) | 5 x 3 (l) | 3 x 2 (e) |
| to | 8 x 1 (t) | 6 x 3 (o) | | | | | |
| fix | 3 x 3 (f) | 4 x 3 (i) | 9 x 2 (x) | | | | |
| A | 2 x 1 (a) | | | | | | |
| date | 3 x 1 (d) | 2 x 1 (a) | 8 x 1 (t) | 3 x 2 (e) | | | |
| for | 3 x 3 (f) | 6 x 3 (o) | 7 x 3 (r) | | | | |
| another | 2 x 1 (a) | 6 x 2 (n) | 6 x 3 (o) | 8 x 1 (t) | 4 x 2 (h) | 3 x 2 (e) | 7 x 3 (r) |
| meeting | 6 x 1 (m) | 3 x 2 (e) | 3 x 2 (e) | 8 x 1 (t) | 4 x 3 (i) | 6 x 2 (n) | 4 x 1 (g) |
| Conventionally: | 7+14+13+10+3+5+12+5+22+4+8+1+5+9+14+12+20=164 | | | | | | - i.e summation of key presses for each word |
| Actual Length: | 4+6+6+4+2+2+4+2+8+2+3+1+4+3+7+7+17=82 | | | | | | - i.e summation of actual lengths of each word |
| Excess Presses: | 164 - 82=+82 | | | | | | - i.e 82 extra key presses than actual length |

Mobile Phone with Basic Physical PIRS features
(PIRS & MT-iDICT Software Contained within the Device)

Fig. 4a

|  | A | B | C | 2 |
|---|---|---|---|---|
|  | And |  |  |  |
|  | Asap |  |  |  |
|  | Ally |  |  |  |
| Input Text | Another |  |  |  |

|

A: a

| Best Use | Symbol | More |

Sample Screen with PSL Activation for Static Mode: Key 2

Fig. 4b

|  | B | A | 2 | C |
|---|---|---|---|---|
|  | B4 |  |  |  |
|  | Been |  |  |  |
|  | British |  |  |  |
| Input Text | Balloon |  |  |  |

|

B: b / be / bee

| *Best Use* | Symbol | More |

Sample Screen with PSL Activation for Static Mode: Best Use + Key 2

Fig. 4c

|  | And |
|---|---|
|  | B4 |
|  | Call |
|  | 2nite |
| Input Text | Asap |

|

And: and / &

| *Best Use* | Symbol | More |

Sample Screen with PSL Activation for Static Mode: Best Use then Key

Fig. 5a

| Input Text | B | A | 2 | C |
|---|---|---|---|---|
| | B4 | | | |
| | Been | | | |
| | British | | | |
| | Balloon | | | |

B: b / be / bee

| Best Use | Symbol | More |

Sample Screen with PSL
Activation for Dynamic
Mode: Key 2

Fig. 5b

| Input Text | A | B | C | 2 |
|---|---|---|---|---|
| | And | | | |
| | Asap | | | |
| | Ally | | | |
| | Another | | | |

A: a

| Best Use | Symbol | More |

Sample Screen with PSL
Activation for Dynamic Mode:
Best Use + Key 2

Fig. 5c

| Input Text | |
|---|---|
| | B4 |
| | And |
| | 2nite |
| | Call |
| | Been |

B4:Before

| Best Use | Symbol | More |

Sample Screen with PSL
Activation for Dynamic Mode:
Best Use then Key 2

| Word: | Key x Presses + Cursor Movement (letter or mnemonic - translation obtained) |
|---|---|
| Dear | 3 x 1 + 2Down (Dear) |
| Friend | 3 x 2 + 3Down (Friend) |
| Please | 7 x 1 + 1Down (Pls - Please) |
| call | 2 x 3 + 3Down + Select (call me) |
| me | |
| as | 2Down (asap - as soon as possible) |
| soon | |
| as | |
| possible | |
| to | 2 x 3 (2 - to) |
| fix | 3 x 3 + 1Down (fix) |
| a | 2 x 1 (a) |
| date | 3 x 1 + 1Down (D8 - date) |
| for | 4 x 4 (4 - for) |
| another | 2 x 1 + 3Down (another) |
| meeting | 6 x 1 + 3Down (meeting) |
| PIRS / MT-iDICT: | 3+5+2+7+2+3+4+1+2+4+4+4+5=46  -i.e. summation of key presses for each word |
| Actual Length: | 81   -i.e. actual message length |
| Excess Presses: | 46 - 81 = -35   -i.e. 35 less key presses than actual message length (43.2% PIRS Improvement) |
| Mobile Phone: | 164   -i.e. number of key presses for conventional Mobile Phone |
| Improvement: | 46 - 164 = -118  -i.e. 118 less key presses than conventional Mobile Phone (71.9% PIRS Improvement) |

| Actual = 81 characters | Standard Mobile | | PIRS Mobile | |
|---|---|---|---|---|
| | Activity | %benefit | Activity | %benefit |
| Key Presses | 164 | -202.5% | 49 | +60.5% |
| Key Presses v. Actual | +83 | -102.5% | -32 | +39.5% |
| PIRS Mobile v. Standard Mobile | | | -115 | +70.1% |

Effectiveness Comparison Standard x. PIRS Mobile

| Input Text | Send | Insert |
|---|---|---|
| | Text | Language |
| | Symbol | In Method |
| | Macros | Priority |
| | Forward | Reply |

Other MORE Categories by Example

Send: this message / other item

| Best Use | Symbol | More |
|---|---|---|

| Send | Message |
|---|---|
| File | Picture |
| Telephone | Email |
| Animation | Video |
| Sound | Melody |

| Insert | Emoticon |
|---|---|
| File | Picture |
| Telephone | Email |
| Animation | Video |
| Sound | Symbol |

| Text | Size |
|---|---|
| Font | C Align |
| L Align | R Align |
| Auto Align | Bold |
| Underline | Italic |

| Language | English |
|---|---|
| German | French |
| Std ABC | 123 |
| Spanish | Italian |
| Chinese | Japanese |

| In Method | MT-iDICT |
|---|---|
| Multi Lap | T9 |
| Predictor | Accessory |
| Voice | Infra-red |
| Bluetooth | Keyboard |

| Macros | Word |
|---|---|
| Elite | Excel |
| Lotus | Yahoo |
| Z Kong | Invaders |
| Golf | Soccer |

MORE Option / Access
Main MORE Category by Example

*Fig. 8*

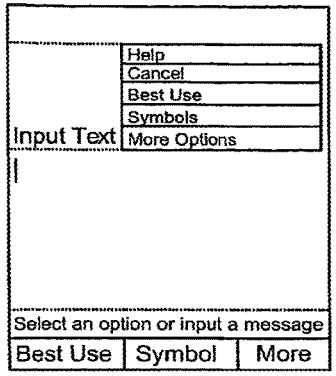
1. System starts Text Input
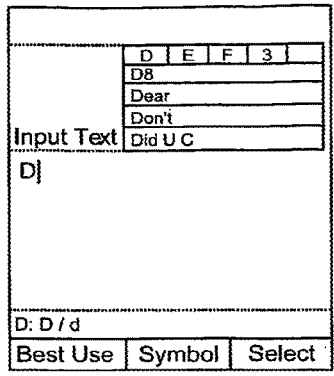
2. Key-3.DEF Pressed
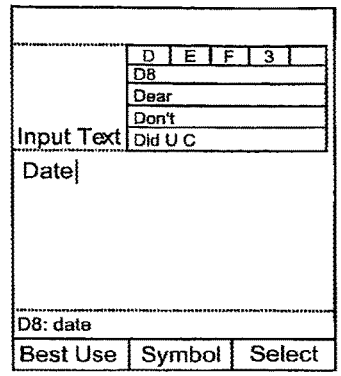
3. Joystick down 1
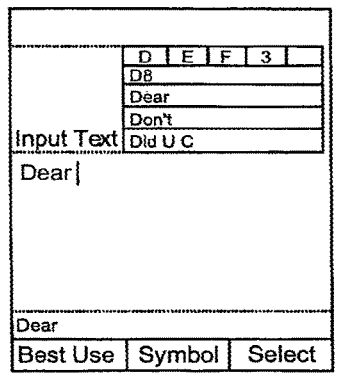
4. Joystick down 1
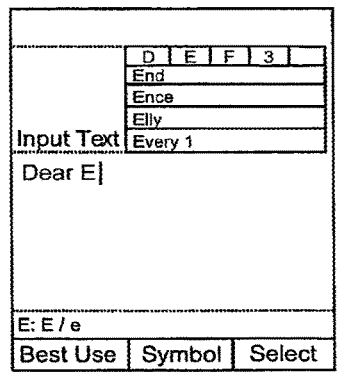
5. Key-3.DEF Pressed
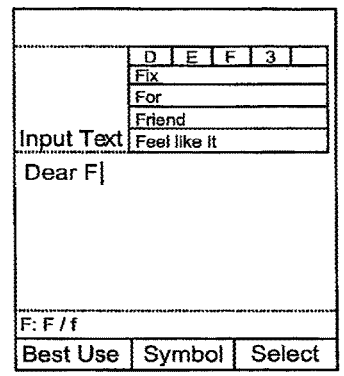
6. Key-3.DEF Pressed
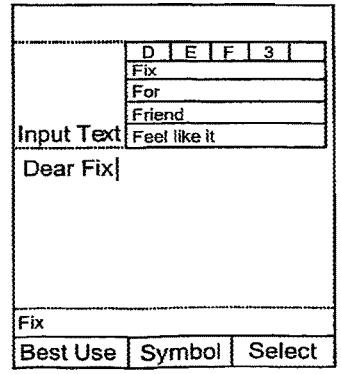
7. Joystick down 1
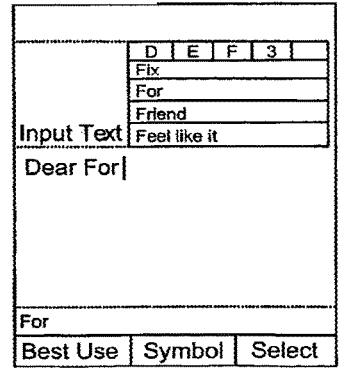
8. Joystick down 1
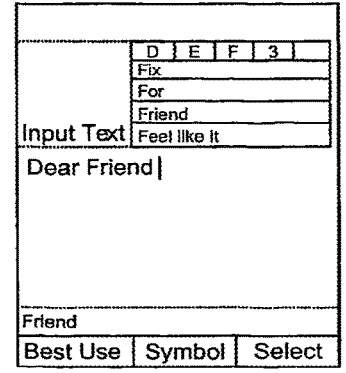
9. Joystick down 1
Fig. 9a

| | 1 | | - | ? |
|---|---|---|---|---|
| | 10 | 100 | | |
| | 12 | One | | |
| | 150 | 1000 | | |
| Input Text | 118 | 1483 | | |

Dear Friend 1|

1: 1 / One
| Best Use | Symbol | Select |

10. Key -1:,.? pressed

| | 1 | . | - | ? |
|---|---|---|---|---|
| | . | | - | |
| | Spc | | Enter | |
| | - | | : | |
| Input Text | _ | | :- | |

Dear Friend,

Punctuation: Comma
| Best Use | Symbol | Select |

11. Key -1:,.? pressed

| | P | Q | R | S | 7 |
|---|---|---|---|---|---|
| | Pls | | | | |
| | Pretend | | | | |
| | Powerful | | | | |
| Input Text | Present8n | | | | |

Dear Friend, P|

P: P / p / pee
| Best Use | Symbol | Select |

12. Key -7:PQRS pressed

| | P | Q | R | S | 7 |
|---|---|---|---|---|---|
| | Pls | | | | |
| | Pretend | | | | |
| | Powerful | | | | |
| Input Text | Present8n | | | | |

Dear Friend, Please|

Pls: Please
| Best Use | Symbol | Select |

13. Joystick down 1

| | A | B | C | 2 |
|---|---|---|---|---|
| | And | | | |
| | Asap | | | |
| | Another | | | |
| Input Text | Alternative | | | |

Dear Friend, Please a|

A: A / a
| Best Use | Symbol | Select |

14. Key -2:ABC pressed

| | A | B | C | 2 |
|---|---|---|---|---|
| | B4 | | | |
| | Been | | | |
| | British | | | |
| Input Text | Balloon | | | |

Dear Friend, Please b|

B: B / b / be / bee
| Best Use | Symbol | Select |

15. Key -2:ABC pressed

| | A | B | C | 2 |
|---|---|---|---|---|
| | Call | | | |
| | Cul8r | | | |
| | Call me | | | |
| Input Text | Conversation | | | |

Dear Friend, Please c|

C: C / c / see
| Best Use | Symbol | Select |

16. Key -2:ABC pressed

| | A | B | C | 2 |
|---|---|---|---|---|
| | Call | | | |
| | Cul8r | | | |
| | Call me | | | |
| Input Text | Conversation | | | |

Dear Friend, Please call|

Call
| Best Use | Symbol | Select |

17. Joystick down 1

| | A | B | C | 2 |
|---|---|---|---|---|
| | Call | | | |
| | Cul8r | | | |
| | Call me | | | |
| Input Text | Conversation | | | |

Dear Friend, Please see you later|

Cul8r: see you later
| Best Use | Symbol | Select |

18. Joystick down 1

*Fig. 9b*

| | A | B | C | 2 |
|---|---|---|---|---|
| | Call | | | |
| | Cul8r | | | |
| | Call me | | | |
| Input Text | Conversation | | | |

Dear Friend, Please call me|

Call me

| Best Use | Symbol | Select |
|---|---|---|

19. Joystick down 1 + Selected

| | A | B | C | 2 |
|---|---|---|---|---|
| | And | | | |
| | Asap | | | |
| | Another | | | |
| Input Text | Alternative | | | |

Dear Friend, Please call me a|

A: A / a

| Best Use | Symbol | Select |
|---|---|---|

20. Previous Select retains current active PSL and goes to 1st index of PSL, i.e. A
NO KEYING OCCURS HERE

| | A | B | C | 2 |
|---|---|---|---|---|
| | And | | | |
| | Asap | | | |
| | Another | | | |
| Input Text | Alternative | | | |

Dear Friend, Please call me and|

And

| Best Use | Symbol | Select |
|---|---|---|

21. Joystick down 1

| | A | B | C | 2 |
|---|---|---|---|---|
| | And | | | |
| | Asap | | | |
| | Another | | | |
| Input Text | Alternative | | | |

Dear Friend, Please call me as soon as possible|

Asap: as soon as possible

| Best Use | Symbol | Select |
|---|---|---|

22. Joystick down 1

| | A | B | C | 2 |
|---|---|---|---|---|
| | B4 | | | |
| | Been | | | |
| | British | | | |
| Input Text | Balloon | | | |

Dear Friend, Please call me as soon as possible b|

B: B / b / be / bee

| Best Use | Symbol | Select |
|---|---|---|

23. Key -2:ABC pressed

| | A | B | C | 2 |
|---|---|---|---|---|
| | Call | | | |
| | Cal8r | | | |
| | Call me | | | |
| Input Text | Conversation | | | |

Dear Friend, Please call me as soon as possible c|

C: C / c / see

| Best Use | Symbol | Select |
|---|---|---|

24. Key -2:ABC pressed

| | A | B | C | 2 |
|---|---|---|---|---|
| | 2nite | | 22 | |
| | 2day | | 20 | |
| | 208 | | 200 | |
| Input Text | 207 | | Two | |

Dear Friend, Please call me as soon as possible to|

2: 2 / to / two

| Best Use | Symbol | Select |
|---|---|---|

25. Key -2:ABC pressed

| | D | E | F | 3 |
|---|---|---|---|---|
| | D8 | | | |
| | Dear | | | |
| | Don't | | | |
| Input Text | Did U C | | | |

Dear Friend, Please call me as soon as possible to d|

| Best Use | Symbol | Select |
|---|---|---|

26. Key -3:DEF pressed

| | D | E | F | 3 |
|---|---|---|---|---|
| | End | | | |
| | Ence | | | |
| | Elly | | | |
| Input Text | Every 1 | | | |

Dear Friend, Please call me as soon as possible to e|

E: E / e

| Best Use | Symbol | Select |
|---|---|---|

27. Key -3:DEF pressed

*Fig. 9c*

|  | D | E | F | 3 |
|---|---|---|---|---|
|  | Fix | | | |
|  | For | | | |
|  | Friend | | | |
| Input Text | Feel like it | | | |

Dear Friend, Please call me as soon as possible to f|

F: F / f
| Best Use | Symbol | Select |

28. Key -3:DEF pressed

|  | D | E | F | 3 |
|---|---|---|---|---|
|  | Fix | | | |
|  | For | | | |
|  | Friend | | | |
| Input Text | Feel like it | | | |

Dear Friend, Please call me as soon as possible to fix|

Fix
| Best Use | Symbol | Select |

29. Joystick down 1

|  | A | B | C | 2 |
|---|---|---|---|---|
|  | And | | | |
|  | Asap | | | |
|  | Another | | | |
| Input Text | Alternative | | | |

Dear Friend, Please call me as soon as possible to fix a|

A: A / a
| Best Use | Symbol | Select |

30. Key -2:ABC pressed

|  | D | E | F | 3 |
|---|---|---|---|---|
|  | D8 | | | |
|  | Dear | | | |
|  | Don't | | | |
| Input Text | Did U C | | | |

Dear Friend, Please call me as soon as possible to fix ad|

D: D / d
| Best Use | Symbol | Select |

31. Key -3:DEF pressed

|  | D | E | F | 3 |
|---|---|---|---|---|
|  | D8 | | | |
|  | Dear | | | |
|  | Don't | | | |
| Input Text | Did U C | | | |

Dear Friend, Please call me as soon as possible to fix a date|

D8: date
| Best Use | Symbol | Select |

32. Joystick down 1

|  | G | H | I | 4 |
|---|---|---|---|---|
|  | G2g | | | |
|  | Gr8 | | | |
|  | Girlfriend | | | |
| Input Text | Get a life | | | |

Dear Friend, Please call me as soon as possible to fix a date g|

G: G / g
| Best Use | Symbol | Select |

33. Key -4:GHI pressed

|  | G | H | I | 4 |
|---|---|---|---|---|
|  | H20 | | | |
|  | Hello | | | |
|  | Heather | | | |
| Input Text | Have 2 go | | | |

Dear Friend, Please call me as soon as possible to fix a date h|

H: H / h
| Best Use | Symbol | Select |

34. Key -4:GHI pressed

|  | G | H | I | 4 |
|---|---|---|---|---|
|  | Ic | | | |
|  | Illy | | | |
|  | Incorrect | | | |
| Input Text | Investig8 | | | |

Dear Friend, Please call me as soon as possible to fix a date i|

I: I / i
| Best Use | Symbol | Select |

35. Key -4:GHI pressed

*Fig. 9d*

| | G | H | 1 | 4 |
|---|---|---|---|---|
| | 4get | | 44 | |
| | 4tun8 | | 40 | |
| | 4ever | | 400 | |
| Input Text | Four | | 4000 | |

Dear Friend, Please call me as soon as possible to fix a date for |

4: 4 / for

| Best Use | Symbol | Select |

36. Key -4:GHI pressed

| | A | B | C | 2 |
|---|---|---|---|---|
| | And | | | |
| | Asap | | | |
| | Another | | | |
| Input Text | Alternative | | | |

Dear Friend, Please call me as soon as possible to fix a date for a|

A: A / a

| Best Use | Symbol | Select |

37. Key -2:ABC pressed

| | A | B | C | 2 |
|---|---|---|---|---|
| | And | | | |
| | Asap | | | |
| | Another | | | |
| Input Text | Alternative | | | |

Dear Friend, Please call me as soon as possible to fix a date for and|

And

| Best Use | Symbol | Select |

38. Joystick down 1

| | A | B | C | 2 |
|---|---|---|---|---|
| | And | | | |
| | Asap | | | |
| | Another | | | |
| Input Text | Alternative | | | |

Dear Friend, Please call me as soon as possible to fix a date for as soon as possible|

Asap: as soon as possible

| Best Use | Symbol | Select |

39. Joystick down 1

| | A | B | C | 2 |
|---|---|---|---|---|
| | And | | | |
| | Asap | | | |
| | Another | | | |
| Input Text | Alternative | | | |

Dear Friend, Please call me as soon as possible to fix a date for another|

Another

| Best Use | Symbol | Select |

40. Joystick down 1

| | M | N | O | 5 |
|---|---|---|---|---|
| | M8 | | | |
| | Ment | | | |
| | Meeting | | | |
| Input Text | More than | | | |

Dear Friend, Please call me as soon as possible to fix a date for another m|

M: M / m

| Best Use | Symbol | Select |

41. Key -6:MNO pressed

| | M | N | O | 6 |
|---|---|---|---|---|
| | M8 | | | |
| | Ment | | | |
| | Meeting | | | |
| Input Text | More than | | | |

Dear Friend, Please call me as soon as possible to fix a date for another mate|

M8: mate

| Best Use | Symbol | Select |

42. Joystick down 1

| | M | N | O | 6 |
|---|---|---|---|---|
| | M8 | | | |
| | Ment | | | |
| | Meeting | | | |
| Input Text | More than | | | |

Dear Friend, Please call me as soon as possible to fix a date for another ment|

Ment

| Best Use | Symbol | Select |

43. Joystick down 1

| | M | N | O | 6 |
|---|---|---|---|---|
| | M8 | | | |
| | Ment | | | |
| | Meeting | | | |
| Input Text | More than | | | |

Dear Friend, Please call me as soon as possible to fix a date for another meeting|

Meeting

| Best Use | Symbol | Select |

41. Key -6:MNO pressed

*Fig. 9e*

Key 2 ABC

| A | B | C | 2 |
|---|---|---|---|
| And | | | |
| Asap | | | |
| Another | | | |
| Alternative | | | |

| A | B | C | 2 |
|---|---|---|---|
| B4 | | | |
| Been | | | |
| British | | | |
| Balloon | | | |

| A | B | C | 2 |
|---|---|---|---|
| Call | | | |
| Cul8r | | | |
| Call me | | | |
| Conversation | | | |

| A | B | C | 2 |
|---|---|---|---|
| 2nite | 22 | | |
| 2day | 20 | | |
| 208 | 200 | | |
| 207 | Two | | |

Key 3 DEF

| D | E | F | 3 |
|---|---|---|---|
| D8 | | | |
| Dear | | | |
| Don't | | | |
| Did U C | | | |

| D | E | F | 3 |
|---|---|---|---|
| End | | | |
| Ence | | | |
| Elly | | | |
| Every 1 | | | |

| D | E | F | 3 |
|---|---|---|---|
| Fix | | | |
| For | | | |
| Friend | | | |
| Feel like it | | | |

| D | E | F | 3 |
|---|---|---|---|
| 30 | 33 | | |
| 31 | 300 | | |
| 379 | 3000 | | |
| 366 | Three | | |

Key 4 GHI

| G | H | I | 4 |
|---|---|---|---|
| G2g | | | |
| Gr8 | | | |
| Girlfriend | | | |
| Get a life | | | |

| G | H | I | 4 |
|---|---|---|---|
| H2O | | | |
| Hello | | | |
| Heather | | | |
| Have 2 go | | | |

| G | H | I | 4 |
|---|---|---|---|
| Ic | | | |
| Illy | | | |
| Incorrect | | | |
| Investig8 | | | |

| G | H | I | 4 |
|---|---|---|---|
| 4get | 44 | | |
| 4tun8 | 40 | | |
| 4ever | 400 | | |
| Four | 4000 | | |

Key 5 JKL

| J | K | L | 5 |
|---|---|---|---|
| J4F | | | |
| Just | | | |
| Jet ski | | | |
| Jonathon | | | |

| J | K | L | 5 |
|---|---|---|---|
| K8 | | | |
| Kit | | | |
| Kiss | | | |
| Keep | | | |

| J | K | L | 5 |
|---|---|---|---|
| L8 | | | |
| Love | | | |
| Less than | | | |
| Listen 2 me | | | |

| J | K | L | 5 |
|---|---|---|---|
| 50 | 55 | | |
| 51 | 500 | | |
| 589 | Five | | |
| 585 | 5000 | | |

Key 6 MNO

| M | N | O | 6 |
|---|---|---|---|
| M8 | | | |
| Ment | | | |
| Meeting | | | |
| More than | | | |

| M | N | O | 6 |
|---|---|---|---|
| N1 | | | |
| Never | | | |
| Need< | | | |
| Next time | | | |

| M | N | O | 6 |
|---|---|---|---|
| Obtw | | | |
| Olly | | | |
| Ordinary | | | |
| Over time | | | |

| M | N | O | 6 |
|---|---|---|---|
| 60 | 66 | | |
| 64 | 600 | | |
| 684 | Six | | |
| 679 | 6000 | | |

Key 7 PQRS

| P | Q | R | S | 7 |
|---|---|---|---|---|
| Pls | | | | |
| Pretend | | | | |
| Powerful | | | | |
| Presentat8n | | | | |

| P | Q | R | S | 7 |
|---|---|---|---|---|
| Qix | | | | |
| Queue | | | | |
| Quote | | | | |
| Question | | | | |

| P | Q | R | S | 7 |
|---|---|---|---|---|
| Rot8 | | | | |
| Regret | | | | |
| Remember | | | | |
| Remind me | | | | |

| P | Q | R | S | 7 |
|---|---|---|---|---|
| See | | | | |
| Sion | | | | |
| Sme1 | | | | |
| Soon | | | | |

| P | Q | R | S | 7 |
|---|---|---|---|---|
| 70 | 77 | | | |
| 707 | 700 | | | |
| 799 | 7000 | | | |
| 718 | Seven | | | |

*Fig. 10a*

Key 8 TUV

| T | U | V | 8 |
|---|---|---|---|
| The | | | |
| Tion | | | |
| Tive | | | |
| There | | | |

| T | U | V | 8 |
|---|---|---|---|
| U2 | | | |
| Use | | | |
| Ully | | | |
| Under | | | |

| T | U | V | 8 |
|---|---|---|---|
| Vgc | | | |
| Very | | | |
| Voice | | | |
| Village | | | |

| T | U | V | 8 |
|---|---|---|---|
| 8n | 88 | | |
| 8or | 800 | | |
| 8teen | 8000 | | |
| 888 | Eight | | |

Key 9 WXYZ

| W | X | Y | Z | 9 |
|---|---|---|---|---|
| W8r | | | | |
| What | | | | |
| When | | | | |
| Would | | | | |

| W | X | Y | Z | 9 |
|---|---|---|---|---|
| Xtra | | | | |
| Xcite | | | | |
| Xample | | | | |
| Xylophone | | | | |

| W | X | Y | Z | 9 |
|---|---|---|---|---|
| You | | | | |
| Yday | | | | |
| Yvonne | | | | |
| Yourself | | | | |

| W | X | Y | Z | 9 |
|---|---|---|---|---|
| Z% | | | | |
| Zero | | | | |
| Zzzz | | | | |
| Zentra | | | | |

| W | X | Y | Z | 9 |
|---|---|---|---|---|
| 90 | 99 | | | |
| 900 | 901 | | | |
| Nine | 9000 | | | |
| 999 | 9004 | | | |

Keys 1, 0, * and #

| 1 | . | , | - | ? |
|---|---|---|---|---|
| 10 | 100 | | | |
| 12 | One | | | |
| 150 | 1000 | | | |
| 118 | 1483 | | | |

| 0 | + | ! | ' | @ |
|---|---|---|---|---|
| 00 | 000 | | | |
| 0207 | 0141 | | | |
| 0208 | 0131 | | | |
| 0800 | Zero | | | |

| a/A Caps | * |
|---|---|
| :-) | @)>--- |
| :-( | -o |
| J^ | xOx |
| IPI | {:-)} |

| Space | # |
|---|---|
| <):( | <0(>>< |
| >I< | >I~ |
| ~:-o | ((h)) |
| ICI | I0—I |

*Fig. 10b*

| Next   | generation | of        | adaptive | intelligence | interfaces |
|--------|------------|-----------|----------|--------------|------------|
| Nextel | day        | delivery  | forward  | thinking     | meeting    |
|        | time       | will be   | meet     | proposal     | dinner     |
|        | step       | statistics| for      | 10:10am      | morning    |
|        | level      | we        | the      | way          | for        |

*Fig. 11*

HUMAN-TO-MOBILE INTERFACES

CROSS-REFERENCE TO RELATED APPLICATIONS

The present application is a National Phase Application of International Application No. PCT/GB2006/001090, filed Mar. 23, 2006, which claims priority to Great Britain Application No. 0505942.3 filed Mar. 23, 2005, which applications are incorporated herein fully by this reference.

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

INCORPORATION-BY-REFERENCE OF MATERIAL SUBMITTED ON A COMPACT DISC (Not Applicable)

BACKGROUND OF THE INVENTION

The present invention relates to human-to-mobile interfaces and particularly, but not exclusively, to data input apparatus and to an interface system, both for facilitating a reduction in the number of key presses required to create a data string (i.e. mnemonics, abbreviations, words, sentences etc.) on a mobile telephone or device equivalent.

Conventional mobile technologies (MT) include basic keypads, navigation means and screen components. The integration of various other add-on accessories into the device, or the connections of external accessories are also possible.

Conventional keypads consist of alphanumeric telephone keys (as shown in FIG. 1); dynamic menu keys that correspond to displayed options controlled and varied by software; and back and cancel keys. Some mobile devices have attachable foldaway or built-in QWERTY or similar keyboards with individual keys for each alphanumeric legend.

Navigation systems include joysticks or cursor keys which can move or indicate left, right, up, down, circular clockwise, circular anti-clockwise, and an activation press down (i.e. trigger-down like a button) either via a direct vertical trigger-down or relative to the motion of navigation trigger-down. A press down activity is a trigger for an event to occur or to be processed by the resident or currently active software systems.

Standard to mobile technologies (MT), are display screens providing displays in either text form or graphic form. The latter is predominant in Smart Phones and PDA systems and provides a versatile Graphical User Interface (GUI) required for the sophisticated software that is usually installed within advanced MT devices.

Other physical aspects can be included that correspond to various other software features. These features run in conjunction with embedded hardware or firmware such as infrared transmitters or wireless/radio transmitters, or connectivity interfaces that enable extension modules such as portable keyboards, computer docking or hands-free accessories to be integrated into or connected to the MT device.

Camera systems are also prevalent on MT devices. Touchpads or touch-screens are also available on MT devices, such as PDA systems.

For mobile telephones in particular, current data-input means are extremely limiting, arduous and inefficient. For example, a user must repeatedly press the same key on a keypad in order to scroll sequentially through each alphanumeric option until the desired character is highlighted or displayed. For example, to display the letter 'b', key '2' must be pressed twice. This method must be repeated for every character required in the composition of a desired word. Despite advancements in mobile telephone performance and handset sizing, data inputting means have remained largely unchanged for over 40 years.

Short Message Service (SMS) text messages allow mobile telephone users to send short alphanumeric messages to other mobile telephones that support the SMS utility. The huge use of SMS Texting has created diverse dictionaries of shortcuts, acronyms, abbreviations, emoticons and conversions of words and phrases, each with the aim of reducing the number of key presses required to convey information. For example, "are you free to chat" may be abbreviated to "ruf2c" to reduce the number of key presses.

To type the following SMS text message "Dear Friend, Please call me as soon as possible to fix a date for another meeting", extensive and repetitive keying is required as depicted in FIG. 2. Upper casing of letters (Key '*' x3=3), general punctuation (Key '1' x2=2) and spacing between words (Key '#' x15=15) accounts for an additional +20 key presses.

When the same key needs to be used successively to access another alphanumeric character assigned to the same key, a pause is required to register the first selection before continuing with accessing the following selection. This is because conventional systems need to distinguish between a user's intention to select the highlighted alphanumeric character and a user's intention to continue scrolling through the assigned alphanumeric characters to access an alternative character ascribed to that same key.

The difficulty with SMS text messaging dictionaries is that they use colloquial or slang terms and are therefore largely user specific. One colloquial or slang term may not be easily understood by another user, and different users tend to create different shortcuts for the same word or phrase. There is no consistency in SMS text messaging dictionaries because they are not standard, regulated or shared on a consistent basis. Instead, they have become customised on a regional and per user or per language basis.

Although SMS text messaging is a modern idiom, it does provide critical communication means for people with disabilities, particularly those who have hearing disabilities.

Human-to-Mobile Interfaces (HMI) need to change in order to fulfil the capacity at which the technology permits optimal use of itself. In particular, there is a need for a human-to-mobile interface which reduces actual physical interactivity (i.e. data input or key presses) while still using existing keyboards, keypads or other conventional input methods or mediums. In this way, a cost effective means to evolve interface methods progressively into the next generation of more advanced and more efficient HMI systems will be achieved.

BRIEF SUMMARY OF THE INVENTION

According to one aspect of the present invention there is a method of character recognition for a mobile telephone data input apparatus comprising a plurality of data input keys having multi-character indicia, said method adapted to facilitate a reduction in the number of user interactions required to create a given data string to less than the number of characters within said data string, the method comprising the following steps: storing a set of data strings each with a priority indicator associated therewith, wherein the indicator is a measure of a plurality of derivatives associated with the data string;

recognising an event;

looking up the most likely subsequent data string to follow the event from the set of data strings based on one or more of the plurality of derivatives;

ordering the data strings for display based on the priority indicator of that data string;

if the required subsequent data string is included in the list selecting the required subsequent data string;

if the required subsequent data string is not included in the list entering an event and repeating steps to determine the required subsequent data string;

updating the priority indicator of the selected data string;

updating the set of data strings based on the updated priority indicator.

According to a second aspect of the present invention there is provided a character recognition apparatus for a mobile telephone comprising a plurality of data input keys having multi-character indicia, said apparatus adapted to facilitate a reduction in the number of user interactions required to create a given data string to less than the number of characters within said data string, the apparatus comprising:

a memory for storing a set of data strings each with a priority indicator associated therewith, wherein the indicator is a measure of a plurality of derivatives associated with the data string;

an event recognition module for recognising an event;

means for looking up the most likely subsequent data string to follow the event from the set of data strings based on one or more of the plurality of derivatives;

display means for displaying a list the most likely subsequent data string in an order based on the priority indicator of that data string;

means for selecting the required subsequent data string if it is included in the list;

data entry means for entering an event;

means for updating the priority indicator of any selected data string and the set of data strings based on the updated priority indicator.

The present invention describes a system that attempts to reduce the number of physical interactions required to create a data string, based on etymological and ontological derivatives extracted from dynamic qualitative and quantitative information corresponding to sub-data strings stored in data dictionaries.

The described system operates through selection of data strings as input rather than the repetitive interactions required by existing systems for text entry or guiding prediction.

Physical interactions include but are not limited to key presses, taps or handwriting gestures.

Derivatives include but are not limited to timestamp, cognitive coherence, perceptual indices, associative indices, grammar orients, correlative weights, inference ratios and pattern factorisation, etc. that represent the adaptive intelligence of the system.

Qualitative and quantitative information stored includes but is not limited to (i) statistical information relating to a data string's historical usage or selection (i.e. frequency of use/selection, character length, lexical pattern density/versatility, chronological weight and direction/operational indicators etc.); (ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; (iii) run-time analytics (scaling patterns of use, historical usages, contextualization, associations and occurrences thereof); (iv) dictionary priority; (v) dictionary chains (where each chain also retains and uses the information in (i), (ii) and (iii) above); (vi) data string maps between other data strings (where each map also retains and uses the information in (i), (ii) and (iii) above); and (vii) translations.

The qualitative and quantitative information could be populated before the system is used and/or populated and manipulated by the user. The system could extract the required qualitative and quantitative information from documents or other data collections relevant to the user. Thus the system can acclimatize to user language traits at any stage.

The qualitative and quantitative information stored in the dictionaries is updated whenever the system is used.

The qualitative and quantitative information could be synchronized between two or more interface systems by means of wired or wireless connectivity. Qualitative and Quantitative information could also be synchronized between two or more interface systems by downloading from and uploading to a common database.

The system can handle multiple data dictionaries at the same time.

The current invention presents an interface system capable of displaying a representation of a plurality of data input keys having multi-character indicia which are receptive to keyed or tapped input. The multi-character indicia are dynamically selected to accord with a statistical extrapolation of the most used alphanumerical character combinations in a given language or for a particular user.

The present invention saves time required for entering a data string.

The present invention empowers usability of mobile devices and thereby, unleashes their capabilities.

The current invention describes a system that provides other physical interactivity reduction features (in addition to providing data strings for selection). These include but are not limited to (i) automatically entering a space after a selected data string; (ii) automatically performing forward or backward translations between mnemonics or abbreviations or acronyms and their corresponding full data strings; (iii) automatically providing alternate suggestions such as synonyms, antonyms, corrections for spelling errors, etc. (iv) providing options to launch applications that are mapped to certain macros, etc.

The current invention describes a system that provides means to the user for configuring all the qualitative and quantitative parameters involved in generating and displaying all the data strings meant for subsequent selection by the user.

The current invention describes a system that can also function as a remote-input mechanism for other personal computing devices.

The current invention describes a system that validates all the other specified claims in a language-independent manner.

The current invention describes a system provides mechanisms or Application Programming Interfaces (API) that allows other software systems to utilise and benefit from all the features of this invention, and to enable improved experiences for the user with such software systems. Additional to this, the API allows other software systems data storage or information repositories to be handled by this invention in similar manner to its own dictionaries etc.

The current system derivatives can be applied to any set of patterns, including but not limited to other world languages.

Differentiation of current system against existing frequency based predictive systems can be made by distinguishing (i) number of factors used in determining suggestions, (ii) factors in current system themselves represent varied properties at any one time including but not limited to discrete values, (iii) factors in current system can be at any one time rules, discrete or continuous statistics, indicators or directive placements, (iv) the current system provides suggestions by evaluating candidates using a dynamic weighing scheme that determined by the inter-relationships of the weighing factors at any one time, (v) current system is a selective input system with absolute keying for refining the projection of suggestions.

Existing prediction systems do not consider the nature of language composition. They solely rely on the frequency of particular words in making predictions and are oblivious to the need of the composition. The current invention attempts to capture the essence of language composition in a dynamic and natural way. The spirit of language composition lies in realizing the importance of context, grammar and semantics. The contributions of context, grammar and semantics are captured by the etymological and ontological derivatives used by the current invention. These derivatives are applied in parallel or sequentially. The derivatives are all inter-related and therefore, can affect their own weight or the weight of other derivatives during execution, resulting in a dynamic weighing scheme. The current invention provides suggestions by evaluating candidates using the dynamic weighing scheme. For example, in a scenario involving three derivatives (say grammar orients, associative indices and contextual ratios), the grammar orients enforces the type (part-of-speech) of suggestion in light of the composition and overall syntax. There are many possibilities for the part-of-speech and this can directed by the other two derivatives. At the same time, the grammar orients influences the weights of associative indices and/or contextual ratios. Clearly, the mechanics for evaluation in any composition scenario are variable and completely dynamic. The execution of the derivatives could yield multiple permutations whereby some permutations may collapse while others may contribute further in the determination of the validity of the composition instance. From this, the non-collapsed permutations will be prioritized over the collapsed ones, thereby yielding valid weighing schemes at this stage. From the remaining permutations, the prioritization could be measured by the continuity, size and length of the candidates. This stage is another tier regarding the various weighing schemes involved.

The dictionaries used by the current invention provide the qualitative and/or quantitative information to build the multi-dimension vector (MDV or matrix) that is created for each composition but could also contain the entire dictionary par se. The associative indices could be weighed (size) according the to distance between of any one or more data strings within this MDV, and the context ratios determine similarly alternative branches relative to other data strings within the current composition instance. These could be permutations for the associative indices influenced by the context ratios. The grammar orients likewise influence which permutations are prioritized according to syntax build of current composition as well as directive of immediate or next N part-of-speech expectations and/or variances thereof. The matrix evolves in real-time dynamically) accordingly building collapsible and non-collapsible permutations, which also begin to influence or direct paths (greatest effect or lineage), weighing schemes, the involved derivatives themselves as well as possibly others that could be activated, and eventual suggestions pertained in the permutation and evolved lineage within the MDV.

BRIEF DESCRIPTION OF THE SEVERAL VIEWS OF THE DRAWINGS

Embodiments of the present invention will now be described, by way of example only, with reference to the following examples, in which:

FIG. 2 is a table showing key-press statistics for the creation of an example data string;

FIGS. 4a-c shows examples of screen-shots of a mobile telephone employing an interface system according to an aspect of the present invention;

FIGS. 5a-c show alternative example screen-shots of a mobile telephone employing an interface system according to an aspect of the present invention;

FIG. 6 shows two tables illustrating comparative statistics (i.e. conventional technology vs. interface system of present invention) relating to the number of key-presses required to create the data string of FIG. 3;

FIG. 7 shows an example screen-shot and four examples Pop-Up selection lists relating to a further optional feature of a mobile telephone employing an interface system according to an aspect of the present invention;

FIG. 8 shows an example screen-shot and six example Pop-Up selection lists relating to a yet further optional feature of a mobile telephone employing an interface system according to an aspect of the present invention;

FIG. 9 shows forty-four example screen-shots relating to each key-press necessary to create the data string exemplified in FIG. 6;

FIG. 10 shows a series of example Pop-Up selection lists relating to each of the twelve conventional keypad keys of a mobile telephone employing an interface system according to an aspect of the present invention;

FIG. 11 shows an example table of associatively mapped and prioritised data strings.

DETAILED DESCRIPTION OF THE INVENTION

Figure 1:
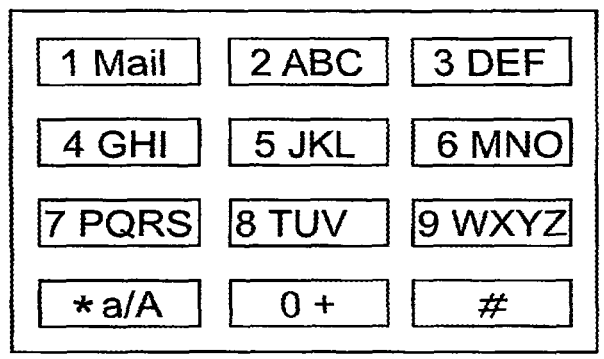
FIG. 1 shows a conventional desk telephone or mobile telephone keypad.

A basic mobile telephone keypad or QWERTY accessory keyboard can include further keys that permit a direct reduction in a user's physical interactivity with the device using the fundamentals of etymology and ontology. These additional keys provide a means to input diverse patterns based on language or graphics and represent particular lexical fragments or basic components of such languages or graphic systems. Foldable accessory keyboards can be extended to have integrated keys dedicated to statistically extrapolated digraphs, tri-graphs, tetra-graphs etc. of any given language to make creation of words more efficient and less user-interactive. This physical interactivity reduction system (PIRS) is an example of a hardware component of the first aspect of the present invention.

Core lexical components or data string fragments combine to create larger data strings. The phrase "data string" and "character string" are interchangeable throughout the specification unless the context requires otherwise. For any given language, its core lexical components (letters, numbers and symbols) and its most occurring character string fragments can be used to create larger complete character strings that become contextual by representing meaningful words, phrases, sentences, paragraphs and fuller texts. Such patterns can include the most frequently occurring digraphs (two-letter combinations forming a single lexical unit, e.g. TH, ER, EN, AN etc.), tri-graphs (three-letter combinations forming a single lexical unit, e.g. ENT, LLY, TCH, ATE etc.), tetra-graphs (four or more letter combinations forming a single lexical unit, e.g. TIVE, ALLY, MENT, ENCE etc.) and sym-graphs (emoticons, e.g. :-) for smiley etc.). A single character being herein referred to as a "graph" and any multiple characters being herein referred to as a multi-graph. The same principles apply to graphic systems by using common and simpler abstract patterns to generate larger, more complex graphic patterns. Those fundamental components occurring with the most frequency in any given language are most useful as key legends or indicia.

The lower the length or size of these core lexical components, the greater their simplicity and the more amplified their cognitive coherence. Cognitive coherence measures a character string's diversity, versatility and breadth of contextualisation in terms of reusability and/or its ability to build larger character strings easily and repeatedly. Letters, numbers and symbols have the highest cognitive coherence since they represent the basic lexical/numerical components and building blocks for any given language. Words, phrases, sentences and fuller texts have lower cognitive coherences the higher one goes up this chain. Digraphs have a particularly high cognitive coherence since they are practically at the bottom of the chain, having a similar cognitive coherence to that of letters. Digraphs can be loosely coupled with other letters and patterns to create larger more meaningful character strings, semantics and contexts.

The use of digraphs, tri-graphs and tetra-graphs provide easy acclimatisation toward their use because of their high cognitive coherences; i.e. they are easily recognisable and easy to place within larger patterns during the construction of meaningful words, phrases, sentences and fuller texts within any context or semantics. Digraphs, tri-graphs and tetra-graphs also reduce the amount of physical interactivity by facilitating a reduction in the number of key presses required to create a character string. This may be achieved by eliminating key-presses by means of providing data input keys having multi-character indicia which correspond with a statistical extrapolation of the most used alphanumerical character combinations (i.e. letters, numbers and symbols) in a given language. The mobile telephone data input apparatus shown in FIG. 3 has conventional data input keys; however, it will be appreciated that keys having statistically derived multi-character indicia could alternatively be used.

Advantages of the mobile telephone data input apparatus of the present invention include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the mobile telephone data input apparatus itself.

Comfort is a palliative benefit. The only effective way to improve ergonomics and prevent injury is to do less of any activity, e.g. reduce typing on keyboards and keypads.

The mobile telephone data input apparatus of the present invention improves the overall user experience and interactivity with MT devices. The apparatus can be used independently of the mobile telephone interface system that forms a second aspect of the present invention (described in detail below), or for maximum benefit, both the data input apparatus and the interface system may be used in combination.

As suggested above, a software-based approach can be used (either in isolation or in combination with the data input apparatus or hardware described above) to reduce a user's physical interactivity with a mobile telephone device. This is achieved by means of a mobile telephone interface system (which will be known under the Trade Marks MT-iDICT™ and/or AdapTex™) that provides and maintains an Adaptive Intelligence™ data dictionary system. This mobile telephone interface system controls and uses various interactivity dynamics, statistics and meta-data pertaining to each entry (including but not limited to mnemonics, abbreviations or acronyms) stored within one or more data dictionaries installed within a storage means of the AdapTeX™ mobile telephone interface system. Zero, one or more dictionaries may be installed at any given time. Dictionary installation and configuration thereof can be done in real-time.

Each data dictionary holds qualitative and/or quantitative information relating to a given data string. Examples of qualitative and/or quantitative information are as follows: (i) statistical information relating to a data string's historical usage or selection (i.e. frequency of use/selection, character length, lexical pattern density/versatility, chronological weight and direction/operational indicators etc.); (ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; or other statistical derivatives based on language and user traits such as time-stamp, cognitive coherence, perceptual indices, associative indices, grammar orients, correlative weights, inference ratios and pattern factorisation etc.); (iii) run-time analytics (scaling patterns of use, historical usages, contextualization, relative associations and occurrences thereof);

(iv) dictionary priority; (v) dictionary chains (where each chain also retains and uses the information in (i), (ii) and (iii) above); (vi) data string maps between other data strings (where each map also retains and uses the information in (i), (ii) and (iii) above); and (vii) translations.

Derivatives are behavioural language properties that can be rules, states, continuous or discrete values, indicators or placements at any one time, whereby each derivative condition can be dynamically manipulated according to other respective derivatives. Therefore, there could be multiple ways to realise these derivatives within the interface system. Different apparatus or method or algorithm can be constructed to exploit these derivatives to provide apposite projections; for example one being simple continuous or discrete statistics based systems only. The value of using these derivatives is that they permit dynamic determination of contextual, grammatical and semantic language compositions as naturally as possible.

The following parameters or derivatives are used in the present invention:

"timestamp"—the date and time the dictionary entry, chain or map was created, last used or accessed.

Preferably adjacent to type of application the invention is being used in conjunction with.

"cognitive coherence"—measures the versatility & flexibility of patterns (i.e., ease of re-usability and placement of language based patterns).

"perceptual indices"—measures the strength of recognizing patterns (i.e., ability to deciphering language based patterns—even when patterns are incorrect/misspelled).

"associative indices"—measures the relevance of two or more patterns (e.g., the combination of words or the appropriateness between words).

"grammar orients"—the lexical syntax or placement of patterns according to their semantics (i.e., rules for contextual and semantic positioning of nouns, verbs, adverbs, adjectives etc.).

"correlative weights"—measures the semantic relevance between two or more patterns (i.e., where different words mean the same or elaborate other words—much like thesaurus weights).

"inference ratios"—measures the likelihood of a semantic relevance between two or more patterns (i.e. occurrence of one word within other words meaning/description).

"pattern factorisation"—measures the ability to create/breakdown larger patterns from/to smaller patterns (i.e., textual or graphic—contextually letters, numbers & symbols have highest factorization, then digraphs, tri-graphs, tetragraphs, words, phrases, sentences, paragraphs, chapters, and finally whole texts in this order of factorization).

These and other qualitative and quantitative information are dynamically updated in real-time and in accordance of use for all entries or data strings, maps and chains, translations maintained within the dictionaries (described in further detail below), and further statistical attributes & software control dynamics.

The data dictionaries can be manually populated and/or manipulated. Alternatively, the data dictionaries can or automatically populated by use of document or text scanners, which scan data strings and assemble their statistics, probabilities, run-time analytics as well as associative maps between data strings. The idea being, that such documents or texts, written by a user, reflect the behavioural use of vocabulary and patterns of the language(s) reflected by the user.

A data string may be in the form of a full data string (i.e. a word, phrase, sentence etc.) or a corresponding truncated data string such as a mnemonic, abbreviation or acronym. The prioritisation of data retrieved from a data dictionary is user-configurable to allow a user to prioritise the ordering of data listed on a display means according to selected qualitative and/or quantitative characteristics. The user configurable parameters include system behavioural parameters, data string statistics, probabilities and analytics (scaling patterns of use: historical usages, contextualization, associations and occurrences thereof), and dictionary priorities.

In addition to those mentioned above, further qualitative and/or quantitative characteristics may include:

(i) the presence or absence of one or more data string fragments in the form of digraphs and/or tri-graphs and/or tetra-graphs etc within a full or truncated data string;

(ii) the presence or absence of truncated data strings in the form of mnemonics, abbreviations or acronyms which correspond with the full data string;

(iii) two-way translations between full data strings and their corresponding truncated data strings;

(iv) the frequency of two-way verbatim, correlated and/or inferred translations between two languages (i.e. English to French);

(v) the character-length of each full data string or its translation or any corresponding truncated data string;

(vi) the frequency of selection by a user of each full data string (i.e. words, numbers, symbols, emoticons etc.) or its translation or any corresponding truncated data string;

(vii) the frequency of forward and backward translations between full and truncated data strings; and (viii) the frequency of forward and backward verbatim, correlated and/or inferred translations between two languages.

Each data dictionary may also hold indicator flags that dictate and delimit control and use of the stored data by the software, and the level that it pertains to relative software tiers.

Data strings stored within the data dictionaries are selected/accessed using the first character of the data string, and could be ordered by descending frequency and ascending length for basic default sequencing. The ordering could be configurable by the user using any field (qualitative or quantitative) of the data dictionary. Ordering can also be configured to be ascending or descending. The first character could be sourced from a single key event (e.g. Key '2' will use letter A to select all data strings which begin with that letter) or a group of first characters obtained from specific key events (e.g. Key '2' will use letters A, B, C and 2 to select all data strings that begin with the respective letters or number).

A configuration tool permits setting the various behavioural aspects (also known as physical interactivity reduction characteristics) of the AdapTex™ mobile telephone interface system. The behavioural aspects (physical interactivity reduction characteristics) are as follows but not limited to:

(i) automatically entering a space after a selected full or truncated data string;

(ii) limitation of displayed mnemonics to those having a total number of characters greater than the number of key presses required to display said mnemonic on the data display means;

(iii) automatically performing forward or backward translations between mnemonics or abbreviations or acronyms and their corresponding full data strings;

(iv) prioritisation of data strings created by any given data input key having multi-character indicia, said prioritisation being based on selected qualitative and/or quantitative information relating to an initial character which matches only one of the indicia on the data input key, and (v) prioritisation of data strings created by any given data input key having multi-character indicia, said prioritisation being based on selected qualitative and/or quantitative information relating to an initial character which matches any of the indicia on the data input key.

Further behavioural aspects include specifying the number of selected entries to be displayed or listed on the display means at any one time, maximising a mnemonic to become the most frequent of its category with highest priority, editing of entries, or ordering run-time selections based on certain qualitative or quantitative characteristics in ascending or descending order etc.

Further behavioural aspects include specifying a projection of N words or sentences by way of using the associative maps and other qualitative/quantitative statistical derivatives.

The interface system can also determine a user's most frequently used phrases (i.e. full data strings) and automatically abbreviate or implode them into a mnemonic, acronym or other abbreviation (i.e. a truncated data string). This allows a user to have fewer key presses via the truncated data string which can then be manually or auto-translated into its corresponding full data string. See the Trans+ and Trans− screen options or buttons on the mobile telephone of FIG. 3 which can be used to perform manual imploding or exploding of data strings. The mobile telephone can also be configured to perform this function automatically.

Due to screen size, a limited number of most used entries pertaining to a key-press can be displayed at any one time. All additional following entries that could not be displayed can be scrolled through using the navigation up to a maximum set by the configuration tool.

The diversity of dictionary types is enormous, e.g. one thousand most used words, mnemonics, acronyms, abbreviations, conversions, Short Message Service (SMS) texting data, emoticons or other data specific to the user and/or a user's working environment etc. Data dictionaries can be even more specialised by being departmentalised within specific working environments. For example, in a medical environment the dictionaries can reflect symptoms and remedies, ailments and pharmaceuticals, or simply provide normal medical terms and their definitions. In a reservation environment, the dictionaries can reflect airlines, destinations, flight codes, seating, hotels, prices etc. In an investment trading environment the dictionaries can reflect trading instruments, traders, portfolios, Reuters Instrument Codes (RIC), trader specific RICs, quantities, buy/sell prices and forecast analytics etc.

Dictionaries can also be integrated into any other software and controlled dynamically to reflect changing circumstances to the entries within respective dictionaries. This provides real-time Adaptive Intelligence relative to the user, working environment and type of system being used adjacent to its purpose.

The real-time maintenance of dictionaries and the dynamics of the AdapTex™ mobile telephone interface system allow it to contour towards a user's traits and uses of the mobile telephone, along with the user's use of language and level of vocabulary. This enables the AdapTex™ mobile telephone interface system to be adaptive and intelligent relative to the user's volume, level and type of use of the system. Over time, the data dictionaries will evolve to reflect the most favourable and most appropriate or relevant mnemonics (truncated data strings) used by the user and thus adapt and contour the AdapTex™ mobile telephone interface system relative to, and more appropriately towards, the user.

As with the mobile telephone data input apparatus of the present invention (i.e. the hardware-based solution of the first aspect of the invention), the benefits of the mobile telephone interface system (i.e. the software-based solution of the second aspect of the invention) include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the mobile telephone data input apparatus itself.

Synchronisation of users' data dictionaries between mobile phones maintains accurate translations, semantics and meanings Synchronisation can occur or be accomplished using infrared, Bluetooth® or other wireless connectivity methods available on mobile telephone devices, or can be achieved by a simple telephone call between the devices. Alternatively, central repositories or databases can be maintained by the communications service providers that the devices can access easily, or they can be maintained and accessed/downloaded via the internet. These synchronisation mechanisms maintain consistency of the dictionaries and their use thereof by groups of users. The central repositories (i.e. internet databases) provide a means to standardise dictionaries for the general population of users.

The mobile telephone interface system software further and more dramatically improves the overall user experience and interactivity with MT devices. The software elements of the mobile telephone interface system can be used independent of the hardware element of the invention described above, or it can be used complimentary to the hardware element. The combination of both the hardware and software elements of the present invention provides the greatest benefits in terms of facilitating a reduction in the number of key-presses required to create a given data string.

Figure 3:
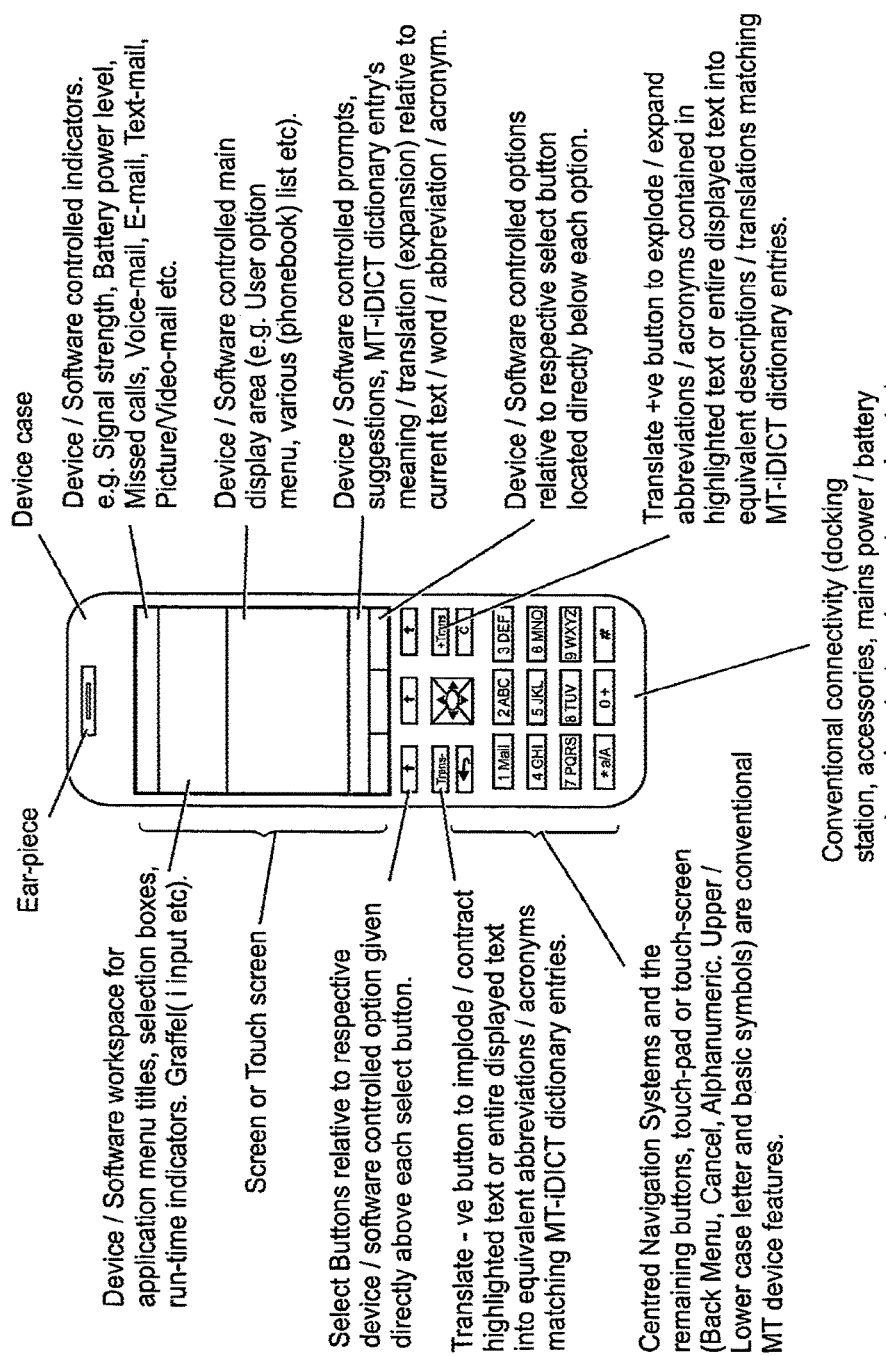
FIG. 3 shows a plan view of a mobile telephone adapted to have basic physical features which facilitate a reduction in the number of key-presses required to create a data string.

One means to make SMS Texting dictionaries or any other dictionary category standard and consistent by virtue of mass volume usage is by integrating them onto the devices themselves. This is something that mobile telephone manufacturers can do or facilitate quite easily. FIG. 3 shows an example of a mobile telephone adapted to have basic physical features which facilitate a reduction in the number of key-presses required to create a given data string. The mobile telephone interface system software works using the dynamic AdapTex™ data dictionaries described above that can be downloaded into the device by Internet, PC or other compatible device using cable or wireless technologies to instigate connectivity and transfer of dictionary data.

Once the mobile telephone interface system software and AdapTex™ data dictionary facilities are integrated or installed into a mobile telephone, the software aspects can use and process AdapTex™ data dictionaries using standard systemic logic to achieve optimum utilisation, i.e. using best processing methods and techniques to obtain all the efficiency benefits. The configuration tool also permits the scanning of existing messages resident on the mobile telephone or remotely mapped to the device in order to acclimatise the AdapTex™ data dictionaries relative to the mnemonics used within the messages.

The mobile telephone interface system software uses the AdapTex™ data dictionaries according to the key sequences being used by the user either in passive mode or in active real-time mode. Various navigation features can be used in parallel or adjacent to the mobile telephone interface system software in order to access more rapidly the most frequently used/typed data strings. Thus effectively reducing the physical aspects of repetitive and recursive keying thereby enhancing efficiency and ease, and thereby improving the overall effectiveness and experience in using the mobile telephone device.

The AdapTex™ mobile telephone interface system automatically activates whenever the device enters into a state that requires any form of input, e.g. numerical or text. The activation summons a Pop-Up Selection List (PSL) according to and relative to key presses, composite key presses, or combinations thereof. The order that letters, symbols and numbers appear for selection, whether on the PSL or touch-screen implemented keypad, depends on whether the AdapTex™ mobile telephone interface system is placed in 'static mode' or 'dynamic mode'.

Static mode uses the same layout and sequence order of letters, numbers and symbols per key as set out on conventional MT devices as illustrated in FIGS. 4a-c. For instance, in static mode the key '2' accesses letters A, B and C and number 2 in this respective sequence/order every time key '2' is used (FIG. 4a). Alternatively, the composite 'Best Use' and Key '2' (FIG. 4b) results the same as if the device was in Dynamic Mode (described in detail below). Alternatively, the sequence 'Best Use' then Key 2 (FIG. 4c) yields a PSL with all the most used words for every letter and number associated with Key '2', in order of frequency and length dependent on configuration settings.

Dynamic mode allows the sequences of letters, numbers and symbols per key to reorder in real-time according to the prioritisation of the qualitative and/or quantitative information stored for each data string used by the user. Examples of qualitative and/or quantitative information are as follows:

(i) statistical information relating to a data string's historical usage or selection (i.e. frequency of use/selection, character length, lexical pattern density/versatility, chronological weight and direction/operational indicators etc.);

(ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; or other statistical derivatives based on language and user traits such as timestamp, cognitive coherence, perceptual indices, associative indices, grammar orients, correlative weights, inference ratios and pattern factorisation etc.);

(iii) run-time analytics (scaling patterns of use, historical usages, contextualization, associations and occurrences thereof);

(iv) dictionary priority;

(v) dictionary chains (where each chain also retains and uses the information in (i), (ii) and (iii) above);

(vi) data string maps between other data strings (where each map also retains and uses the information in (i), (ii) and (iii) above); and (vii) translations.

Referring now to FIGS. 5a-c, for instance, in dynamic mode the key '2' could, access letters and numbers in sequence/order of B, A, 2, C due to letter B or words beginning with B being of a higher priority than letter A or words beginning with A, and likewise letter A or words beginning with A being of a higher priority than number 2 or numbers beginning with 2, and so on (FIG. 5a). Alternatively, the composite 'Best Use' and Key '2' (FIG. 5b) results the same as if the device was in Static Mode (described above). Alternatively, the sequence 'Best Use' then Key '2' (FIG. 5c) yields a PSL with all the words for every letter and number associated with Key '2', in order of priority and length dependent on configuration settings.

Priority is only one example of information, parameters etc which might order the words or strings. Many others are described herein. In addition priority may be determined from any combination of parameters of a specific data string or word.

The first data string or system option in a PSL is highlighted for selection by the user by default. The highlighted data string or system option is selected/activated using the navigation system or screen option keys. Highlighted data strings or system options are also automatically selected if any other key is pressed apart from the navigation or screen option keys (i.e. see the 'Select' option in FIG. 9).

Alternatively, the first letter of each data string is underlined whereby pressing the respective key selects the data string or system option without the need to scroll to it first. Where there is more than one data string or system option with the same initial character, these are scrolled through in the order presented in the Pop-Up selection list. Similarly, data strings or system options with different initial characters but respective to one key (e.g. 'input Text' and 'Help' relative to the 4ghi key) are scrolled through in the order presented in the Pop-Up selection list. Selection of 'Input Text' will result in a prompt for typing of an SMS text message or any other text input or conversion into text input.

With regard to the entering of a telephone number, conventionally this is done by entering the number itself or via a phonebook search. However, with regard to the present invention, as a user begins to type a number, best matches of the typed digits are matched to those stored within the mobile telephone number phonebook to display a filtered Pop-Up name list relative to the digits typed and selections and prioritizations derived from the data storage (dictionary, data string, chain or map etc.) qualitative and/or quantitative information, methods, and patterns of use. This facilitates a more efficient means of selection and is an example demonstrating the integration of AdapTex™ with other software such as the device phonebook system and storage.

Here the AdapTex™ treats other software information as any other dictionary and provides other software systems to fully utilise all of the AdapTex™ interface features.

Keypads provided on touch-screen devices can therefore also dynamically display the re-ordered sequence/order of letters associated per key relative to the prioritizations derived from the data storage (dictionary, data string, chain or map etc.) qualitative and/or quantitative information, methods, and patterns of use of the associated letters or words beginning with those letters for each respective key.

Additional conventional symbols, like graphic smiley faces or white characters like ENTER or RETURN can also be included to expand the range of characters available to the AdapTex™ mobile telephone interface system. This also includes symbol based Emoticons (e.g. ':-)' represents Smiley, '>r' represents 'greater' or '@}>--' represents a 'flower'.

During PSL, the navigation system can be used to scroll through the items according to the cursor direction being applied. Alternatively, repetitious pressing of the key that invoked the PSL for that key will scroll left to right through the letters and numbers associated to that key.

For instance, in the above example for both static and dynamic modes of operation and PSL instigated by Key '2' and/or 'Best Use' and Key '2', repeated Key '2' or cursor left or right would scroll horizontally through each letter and number, whereby a cursor up or down would scroll vertically through each letter's or number's listed most used mnemonics, and whereby cursor trigger-down, cursor right or left, the activating key, a timeout, or any other key press would select the current highlighted entry. Alternatively, in the above example for both static and dynamic modes of operation and PSL instigated by 'Best Use' then Key '2', repeated Key '2' or cursor up or down would scroll vertically through each PSL entry, whereby cursor trigger-down, cursor right or left, the activating key, a timeout, or any other key press would select the current highlighted entry.

To type the following SMS text message "Dear Friend, Please call me as soon as possible to fix a date for another meeting" requires the following events/key presses under the AdapTex™ mobile telephone interface system based upon the Mobile Phone Example Pop-Up Selection Lists (see below). Automatic forward translation from mnemonic to description/translation is assumed to be set to ON via the configuration tool, as is auto-spacing after selecting a mnemonic. Upper casing of letters (Key '*' x3=3), general punctuation (Key '1' x2=2) and spacing between words (Auto-Spacing ON=0) account for +5 additional key presses in the example shown in the table in FIG. 6.

FIG. 9 shows example screen-shots of each key-press necessary to create the data string exemplified in FIG. 6. In these examples, the optional physical interactivity reduction functions 'Auto Spacing' and 'Auto-Translate' are active and the 'Auto-project' (described below) is OFF. Note that the 'Auto-Translate' function can alternatively be performed manually by pressing the 'Trans+' key shown in FIG. 3. The software option changes from 'More' to 'Select' when the Pop-Up selection (PSL) mode is active. 'Select' allows an item to be selected from the PSL whilst retaining the current PSL active. For example, if 'Select' is used in screen event 3 shown in FIG. 9, then the data string "date" would be chosen (i.e. the full data string of its corresponding truncated data string—"D8") and the PSL will remain active for key 'D' and retain the PSL on its first index, i.e. 'D'. However, using the same example, if data string selection is achieved by means of a 'Joystick Left' action, the data string "date" would be chosen and the PSL will remain active for key 'D' and retain the PSL on the current index, i.e. 'D'. Further key presses of the current active key, e.g. key-3-DEF, would move to the next character selection of the same key, i.e. key 'E' and display it's PSL.

If the 'Auto-project' mode was set to ON in the example above, then a projection of n words of the entire phrase would be projected upon keying 'd' and automatically or manually selecting 'Dear'.

The AdapTex™ mobile telephone interface system is not a Predictive Typing System (PTS). PTS integration with the AdapTex™ mobile telephone interface system would allow the PTS to predict more accurately since it is adapting to the users vocabulary in real-time and can presume to hit the users most used data strings (i.e., words, mnemonics etc.) at every instance.

The AdapTex™ mobile telephone interface system formulates logic and prioritisations derived from the data storage (dictionary, data string, chain or map etc.) qualitative and/or quantitative information, methods, frequencies and patterns of behaviour and usages of words/mnemonics of the user. Thus, it becomes adaptive to the user and the user's vocabulary and traits. This provides the most favourable and most appropriate or relevant choices for the user based on the user's actual vocabulary, historic usages, methods and prioritizations derived from the data storage (dictionary, data string, chain or map etc.) qualitative and/or quantitative information, and patterns of use thereof. The AdapTex™ mobile telephone interface system provides mnemonic choices based on usages rather than guesswork to what the user is trying to type relative to a static generic dictionary.

An extension to the translation mode is the automatic generation of acronyms, abbreviation and conversions. Here the interface system can dynamically determine acronyms, abbreviations and conversions for such mapped associations, thereby providing automated translator shortcuts for the most recurring or commonly used phrases, sentences or texts of n character strings, which can be stored and maintained within any dictionary and made readily available. The user is made aware of such automated acronyms, abbreviations and conversions via the interface system dictionary console, display/reporting and edit features where the user can also create personalized shortcuts and where these shortcuts can also include system or device commands and executable instructions/macros.

The mobile telephone interface system is also provided with a 'mapping mode'. Dependent on this mode being activated and various chains between dictionaries being predefined and established by the user during installation or via run-time configuration tools, or automatic chaining is activated, the interface system will perform chained translations of typed or highlighted text. This involves the interface system scanning and mapping appropriate translations from one dictionary to another. Here the interface system maintains lookup chains between any dictionaries such that dynamic mapping can be made from one dictionary to another, and so on. For example, English-to-French (dog, chien) and French-to-German (chien, hund) dictionaries can be chained such that it can infer English-to-German (dog, hund) mapping.

More sophisticated dynamic mappings could chain for example a symptoms dictionary to a prescriptions dictionary whereby relevant character strings are matched between any dictionary entries and translations to dynamically chain such dictionaries together and induce n ailment to medicine mappings. A single mapping is definitive whereas a list of n mappings are prioritised accordingly and made available via the PSL feature. The number of chained dictionaries is dependent on the number and permutations of installed dictionaries.

The mobile telephone interface system is also provided with a 'project mode'. When activated, the various maps between entries within respective installed dictionaries (the maps being predefined or established automatically or manually by the user during installation or run-time) allow the interface system to determine and project the most likely associations between n entries relative to the keyed or highlighted text. The most relevant, user contoured and adaptive appropriations spanning n derived sub-data strings are then displayed for selection by a user.

The interface system maintains associative maps between data strings within two or more dictionaries, such that these maps can be used to dynamically infer associations between data strings based on map statistics, probabilities and analytics (scaling patterns of use: historical usages, contextualization, associations and occurrences thereof). This allows the interface system to project and retrieve the n most likely appropriations or closely associated data strings from the dictionaries that are relevant, definitive and user oriented, and each data string being apposite to context.

Optionally, the data processing means can dynamically retrieve a list of alternative appropriations with respect to each mapped association used to induce each of the n respective data strings, whereby each list of alternative appropriations are prioritised and made available via the PSL feature. Once a longer data string is selected from the PSL, this dynamically induces and propagates a further projection and retrieval of n further data strings, each corresponding to a previous mapped association or PSL selection.

FIG. 11 shows a table of associatively mapped and prioritised data strings. The AdapTex™ mobile telephone interface system can multi-map dictionary entries to other entries within the same and/or other dictionaries. These maps are based on analytics of patterns of use or relativity between the mapped entries. These analytics are dynamic because they change priorities and switch context according to patterns of use.

Thus, a user can specify n projections whereby AdapTex™ will map entries to give n sequential appropriation lists of up to, say, five subsequent outcomes relative to a previous entry. Each subsequent appropriation list is prioritized and each can then be selected out of the five if required, most likely not since the top entry for each list will be most likely for use.

For example, if the word "Next" is typed or keyed then the projected words (sub-data strings) shown in FIG. 11 would appear (i.e. 'generation', 'of, 'adaptive', 'intelligence', 'interfaces'). Each projected word produces a PSL (for example, the word 'generation' produces a list of other words below it) that can be manually toggled for selection when a user skips to each projection unless a user accepts the suggested projection. The PSL is in priority order of patterns of use and context switching. The spacing in the table is for clarity only and would not appear on as such on the display.

On a non-touch screen system the user would navigate to the appropriate word for changing and on a touch-screen simply tap the word with the stylus. In either case the PSL for that word would appear for alternative selection or replacement of the suggested word. If a suggested word is altered then the subsequent words would change dynamically, contextually as well as associatively map to the new selected word. The user can alternatively type a new word from scratch over any original word selection.

On typing each letter of the word 'Next', appropriate selection lists are derived where the beginning of each list entry reflect the current typed letters. For example, typing the letters 'Ne' would provide a list of say, 'Next, Never, Neither, Neighbour, Nederland'. From such a list the highest weighted entry would be shown, in this particular example 'Next' and the letters 'xt' would be highlighted and available for selection to complete word 'Next'.

AdapTex™ will also appropriate the word as it is typed and dynamically change the projections according to any changes to it. This makes it much more Adaptive Intelligent than it already is. An option to highlight only words within a projection that require changing is provided, where remaining unselected words are not dynamically changeable.

The interface system could exploit the flexibility in its structure to provide projections based on true syntax, context, semantic and grammar meta data.

Continual flow from one selection to subsequent words could be provided such that a SPACE or cursor movement is adequate to perform a selection and move to word relative to direction without the need to use additional select methods, i.e. a cursor movement from a highlight auto-selects the highlighted item unless another mechanism is used to do otherwise.

The data processing means can provide manual or automatic spell check features. The data processing means can provide a freeze point enabling the retrieval of static constant appropriations as opposed to dynamic, and which can be based on either most recent or current captured entry statistics, probabilities and analytics (scaling patterns of use: historical usages, contextualization, associations and occurrences thereof), or manually intervened prioritization or overrides". The data processing means can operate on any type of interface medium, keyboard and/or keypad, whether they are conventional or alternative.

Duplications are handled by prioritising the installed dictionaries whereby entries within a higher priority dictionary have precedence or are determined if manual overrides have been put in place by the user during installation or run-time configuration.

Figure 12:
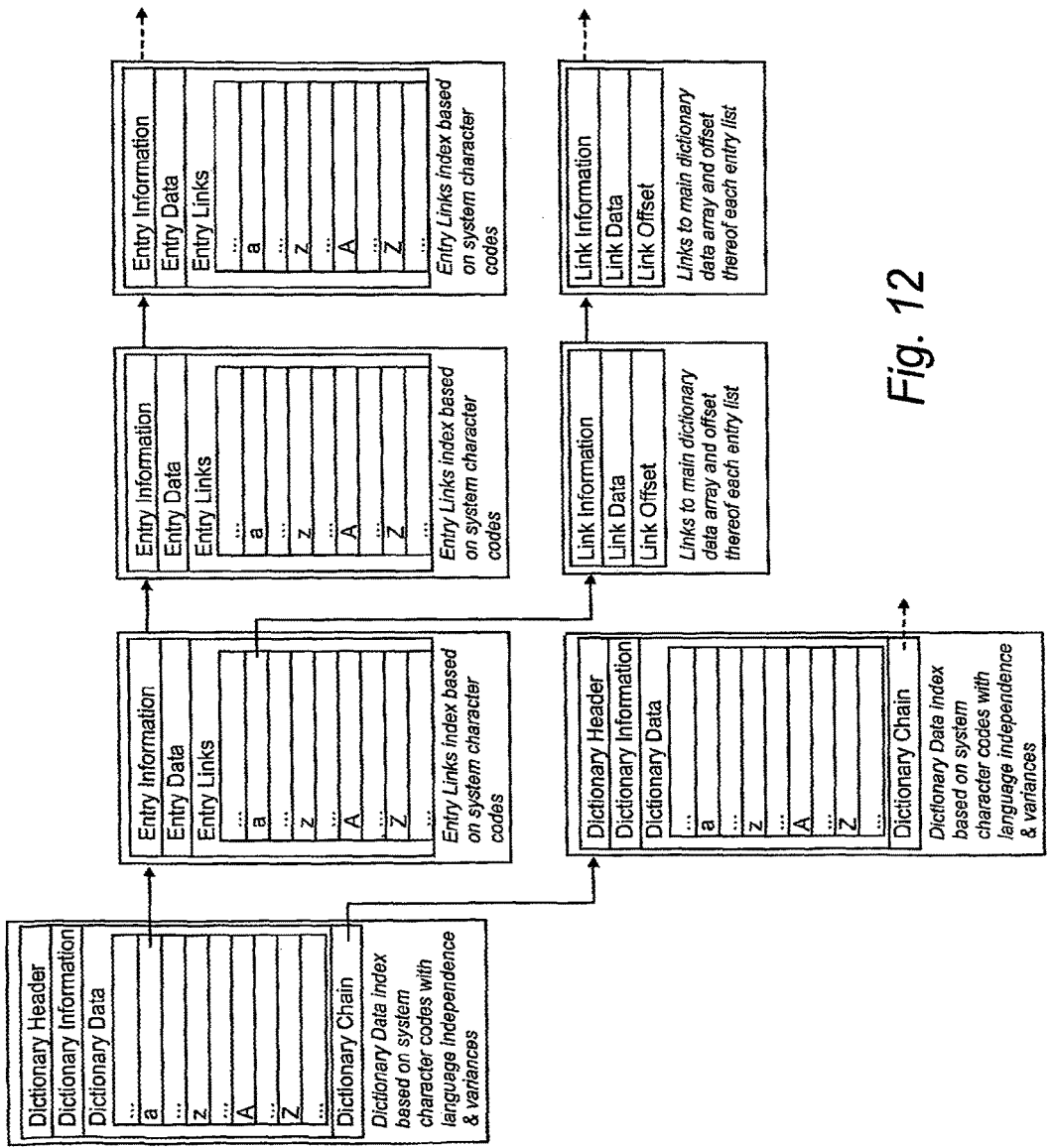
FIG. 12 illustrates the chaining of data dictionaries and associative mapping.

The following provides an example method to represent dictionary information, indexing and chaining as shown in FIG. 12. It also depicts an example method to represent dictionary entry information, indexing and mapping. Although RDBMS could be used, a dynamic method could use system character code tables or repertoires that come in standard ASCII, ISO, UNICODE and other formats that also include language character variants. The system character codes provide the index to each series of dictionary entries that begin with that code. Subsequent entries of the same code are dynamically generated and mapped to the previous entry in the same array for that code. Each entry holds its own statistical derivatives (i.e., timestamp, translation, expansion, frequency, length, cognitive coherence, perceptual indices, associative indices, grammar orient, correlative weights, inference ratios, pattern factorization and context probabilities etc.).

Additionally entry maps are formed to associate entries between themselves, i.e. maintain etymological relationships and statistical derivatives between entries. These entry maps again are indexed using system character code tables. The system character codes provide the index to each series of entry maps that begin with that code. Subsequent maps of the same code are dynamically generated and mapped to the previous map in the same series of that code.

Dictionary chaining provides correlation and inference between dictionaries and their entries and maps. Entry mapping provides inference and association between entries and their maps.

This method allows dynamic generation of dictionaries and their variable entries and respective entry maps. It also provides an example indexing system for rapid access to entries and their associated or related map entries. The method permits a spatial/multi-dimensional matrix to represent dictionary dynamics.

A unique aspect of the present invention is that it provides mechanisms or Application Programming Interfaces (API) that allows other software systems to utilise and benefit from all the features of this invention, and to enable improved experiences for the user with such software systems. Additional to this, the API allows other software systems data storage or information repositories to be handled by this invention in similar manner to its own dictionaries etc.

Predictive Typing Systems (PTS) do not reduce the amount of interactivity as effectively as the AdapTex™ mobile telephone interface system purely because the former still requires further key-presses to guide its prediction, whereas the latter simply provides discrete choices of full or partial mnemonics (i.e. shortcuts/hands, whole words, phrases, or partial patterns that can be used to build up or complete other patterns, e.g. di-graphs, tri-graphs, tetra-graphs and symbol-graphs).

The AdapTex™ mobile telephone interface system has a standardised set of default dictionaries. However, other or additional dictionaries can be installed as standard either when the device is shipped or when users pre-install their bespoke dictionaries on setup. These new entries can be edited by the user at will.

The examples shown in FIG. 10 assume that the AdapTex™ mobile telephone interface system is in static mode, whereby the sequence/order of displayed letters associated with their respective key is depicted in conventional chronological order. Whenever in text input mode the illustrated Pop-Up selection lists are displayed according to the activating key and appropriate navigations. The Pop-Up selection lists also depict examples of the most frequently used mnemonics based on prioritizations derived from the data storage (dictionary, data string, chain or map etc.) qualitative and/or quantitative information, methods, and patterns of use or numbers relative to each letter or digit associated with its respective key.

The Pop-Up selection lists illustrated in FIG. 10 are merely examples and would otherwise dynamically depict entries within the installed dictionaries and ordered relative to each user's patterns of use. Keys '*' and '#' also provide emoticons as well as normal functions. Pop-Up selection lists can also provide for system options. For example, Keying 'S' may, in addition to displaying a filtered and prioritised list of data strings beginning with the letter '5', also display system options such as 'send' or 'spell check'.

The 'Best Use' then 'Key' combination creates a composite mnemonic list by taking the first/priority mnemonic for each corresponding letter or number and combining it to make an optimal list. This is relative to static and dynamic modes of operations as earlier exemplifications show, i.e. presented in order of the letters and numbers shown and dependent on mode of operation when PSL is instigated. For instance, using the PSL examples above and in static mode 'Best Use' then Key '4' will give G2g, H20, Ic, 4get, whereas in dynamic mode it may possibly give 4get, H20, G2g, Ic dependent on which start letter, number or mnemonic is most used.

User typed words are entered into the AdapTex™ mobile telephone interface system's data dictionary when no such entry existed beforehand. In addition, relevant data string maps, associations and contextualization parameters are also derived and maintained for all such new data string entries within the data storage means. This mechanism allows the device to adapt to the users usage and environment that dictates type and level of use. The new entries are immediately accessible by normal AdapTex™ means. Thus, the PIRS and/or AdapTex™ mobile telephone interface system adapt in real-time making interaction for the user more familiar and relative information more apparent to use and/or access.

Software application names relative to a letter on a key can be set to macro mode, thus when pressing the key the PSL gives option to start an application from its list (e.g., Key '9': WORD, XCEL, YAHOO, ZANY KONG).

Figure 7:
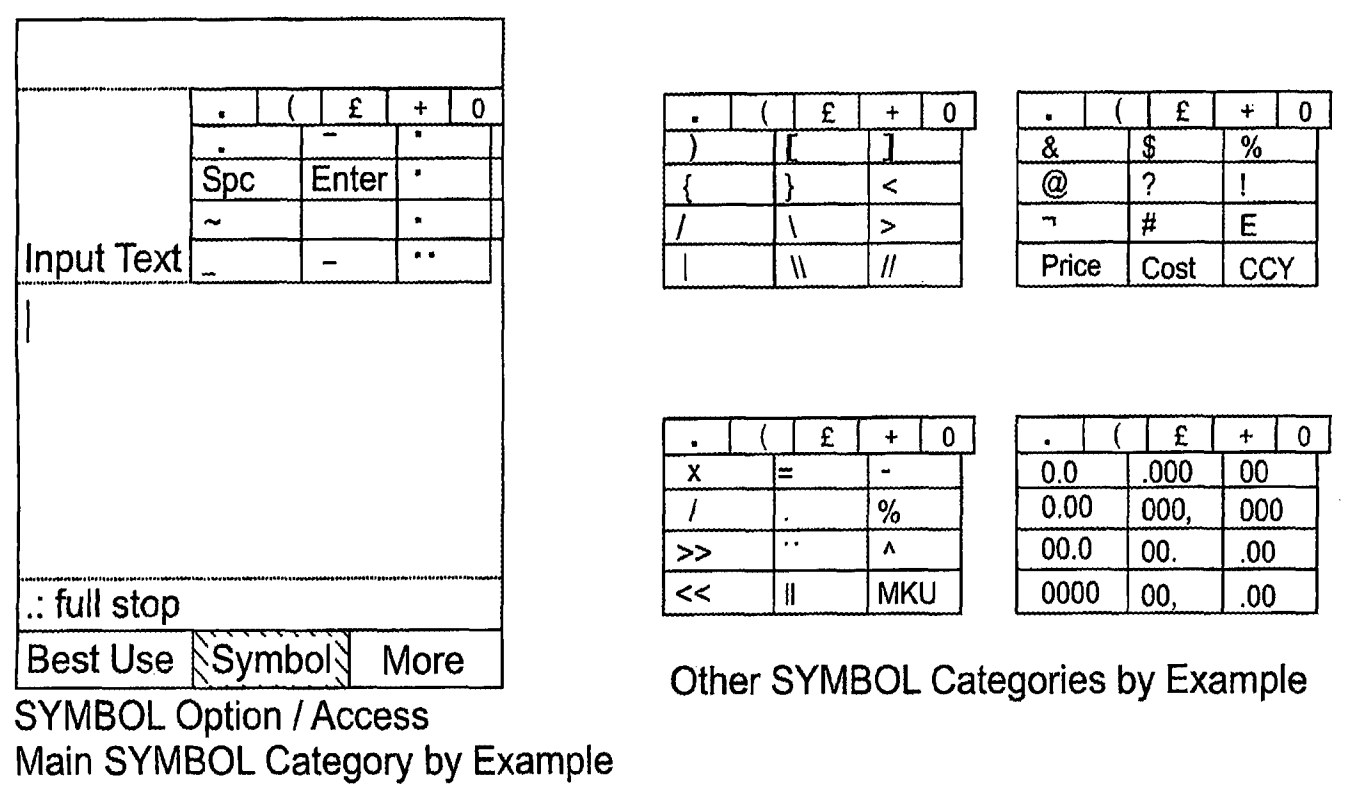

Symbols can be accessed using the software 'Symbols' option. The symbols are categorised and ordered according to qualitative and/or quantitative priority. The priority determines the ease of access to the symbols when the 'Symbols' option is instigated. The example illustrated in FIG. 7 depicts the PSL for the Symbol option along with example categories. Normal navigation system usages apply access to the various symbols.

Software facilities, inserts or application macros can be accessed using the software 'More' option. Again, like 'Symbols', the 'More' options are categorised and ordered according to qualitative and/or quantitative priority. The priority determines the ease of access to the options when 'More' is instigated. The example illustrated in FIG. 8 depicts the PSL for the 'More' option along with example categories. Normal navigation system usages apply access to the various 'More' options. Optionally, one or more mobile telephone interface systems can be used as an input medium for other technologies by way of wired or wireless communications (i.e. infrared or Bluetooth® etc.). For example, one or more of these systems can remotely be used as the keyboard for a PC by replacing the conventional PC keyboard. The dictionary synchronisation modules between the personal computing device and the PC can also control and relay data strings from the device to the PC as a default input medium for the PC, as well as synchronise dictionaries simultaneously.

The invention provides a mobile telephone data input apparatus comprising a plurality of data input keys having multi-character indicia, said apparatus adapted to facilitate a reduction in the number of key presses required to create a given data string to less than the number of characters within said data string.

The multi-character indicia are selected to accord with a statistical extrapolation of the most used alphanumerical character combinations in a given language.

The inventions provides a mobile telephone interface system adapted to facilitate a reduction in the number of data input key presses required to create a data string to less than the number of characters within said data string; said system comprising mobile telephone data input apparatus; data storage means; data processing means; and data display means, wherein the data processing means: filters data stored within the data storage means by initial character, as determined by the character or characters ascribed to a data input key initially pressed by a user; prioritises said filtered data in real-time according to user-configurable prioritisation parameters; and displays one or more prioritised data strings on the data display means for subsequent selection by the user.

A plurality of the most relevant longer data strings may be displayed in a prioritised list for selection by a user. Selection of a longer data string or part of a longer data string induces a repetition of associative mapping such that a further one or more relevant longer data strings are displayed for selection by a user. The relevance or the prioritisation of each longer data string is determined according to statistical and/or probability information stored within the data dictionaries.

Statistical information relates to but is not limited to the historical inputting and/or selection of data strings. The historical inputting and/or selection information can be one or more of the following: (i) frequency of use; (ii) frequency of selection (iii) character length; (iv) lexical pattern density; and (v) chronological weighting.

Probability information can be one or more of the following: (i) occurrence and/or association ratios of two or more sub-data strings within a longer data string; (ii) context ratios determining the likelihood of a given data string being grouped with one or more other sub-data strings to determine the context of a longer data string. The data processing means can selectively bypass or reset the dynamically updated qualitative and quantitative information.

Synchronisation of data dictionaries between two or more mobile telephones can be accomplished by means of wireless connectivity. Synchronisation of data dictionaries between two or more mobile telephones can be accomplished by means of data exchange during a standard telephone call. Synchronisation of data dictionaries between two or more mobile telephones can be accomplished by means of downloading from a common database.

The dictionaries may be manually populated and/or manipulated. The population of each data dictionary with data and its corresponding qualitative and/or quantitative information may be accelerated by uploading onto the data storage means data strings resident on a mobile telephone or a remotely connected device. Alternatively, the dictionaries are populated by scanning external data strings by means of scanning apparatus.

The configuration means is adapted to allow a user to selectively enable or disable physical interactivity reduction characteristics of the interface system which facilitate a reduction in the number of key presses required to create a data string. The physical interactivity reduction characteristics are selected from the group comprising but not limited to:

(i) automatically entering a space after a selected data string, (ii) limitation of displayed mnemonics to those having a total number of characters greater than the number of key presses required to display said mnemonic on the data display means;

(iii) automatically performing forward or backward translations between mnemonics or abbreviations or acronyms and their corresponding full data strings;

(iv) prioritisation of data strings created by any given data input key having multi-character indicia, said prioritisation being based on selected qualitative and/or quantitative information relating to an initial character which matches only one of the indicia on the data input key; and (v) prioritisation of data strings created by any given data input key having multi-character indicia, said prioritisation being based on selected qualitative and/or quantitative information relating to an initial character, which matches any of the indicia on the data, input key.

Successive key presses or composite key presses act to filter further the number of data strings displayed on the data display means for subsequent selection by the user. The one or more data strings displayed on the data display means for subsequent selection by the user are displayed in list format in descending order of priority.

Modifications and improvements may be made without departing from the scope of the present invention.

The invention claimed is:

1. A method of character recognition for a mobile telephone data input apparatus comprising a plurality of data input keys having multi-character indicia, said method adapted to facilitate a reduction in the number of user interactions required to create a given data string to less than the number of characters within said given data string, the method comprising the following steps:

step A comprising storing a set of a plurality of data strings each with a priority indicator associated therewith in a data dictionary, wherein each of the priority indicators is a measure of a plurality of derivatives associated with the data strings, wherein each derivative of the plurality of derivatives is a different one of a plurality of behavioral language properties that measures a different one of a plurality of characteristics of one or more patterns among the plurality of data strings, and wherein the plurality of derivatives are inter-related with each other such that a weight of one of the plurality of derivatives is influenced by a weight of another of the plurality of derivatives;

step B comprising recognizing an event;

step C comprising looking up a most likely subsequent data string to follow the event from the set of the plurality of data strings based on the plurality of derivatives;

step D comprising ordering the plurality of data strings for display based on the priority indicator of the most likely subsequent data string;

step E comprising if a required subsequent data string is included in a list, selecting the required subsequent data string;

step F comprising if the required subsequent data string is not included in the list entering an event and repeating steps B to E;

step G comprising updating the priority indicator of the selected required subsequent data string;

step H comprising updating the set of the plurality of data strings based on the updated priority indicator;

wherein associative maps are maintained between data strings within two or more data dictionaries, the maps being used to dynamically infer associations between data strings based on map statistics, probabilities and analytics; and a lookup chain is maintained between data dictionaries such that dynamic mapping can be made from one dictionary to another.

2. The method of claim 1, further comprising providing the derivatives as a plurality of etymological derivatives.

3. The method of claim 1, further comprising providing the derivatives to include one or more of a timestamp, a cognitive coherence, a perceptual index, an associative index, a grammar orient, a correlative weight, an inference ratio and a pattern factorization.

4. The method of claim 1, further comprising determining the priority indicator from qualitative and quantitative data related to each data string in the set.

5. The method of claim 1, further comprising determining the priority indicator from one or more of the following:
statistical information;
probability information;
data string analysis information;
dictionary priority;
dictionary chains;
data string maps between other data strings; and
data string translations.

6. The method of claim 1, wherein the step of recognizing an event comprises recognizing one or more of a character, a graph, a multi-graph, a data string, a context, a symbol or any other user or machine generated input.

7. The method of claim 1, further comprising providing the set of the plurality of data strings as said dictionary including a plurality of words, phrases and any other data string which might be used in the communication of a message.

8. The method of claim 7, further comprising adding data strings to the dictionary as they are entered by a user.

9. The method of claim 1, further comprising updating all priority indicators dynamically in real-time.

10. The method of claim 1, further comprising ordering a data string in a first of said data dictionaries that is mapped to a plurality of data strings in one or more other data dictionaries based on the priority indicator to enable selection by a user.

11. The method of claim 1, further comprising displaying a list of the most likely subsequent data string in an order based on the priority indicator to enable the user to select the required subsequent data string.

12. The method of claim 1, further comprising providing the derivatives as a plurality of ontological derivatives.

13. A mobile phone including a character recognition apparatus, the mobile telephone comprising a plurality of data input keys having multi-character indicia, said apparatus adapted to facilitate a reduction in the number of user interactions required to create a given data string to less than the number of characters within said given data string, the apparatus comprising:

a memory, in which a set of a plurality of data strings can be stored, each with a priority indicator associated therewith in a data dictionary, wherein the indicator is a measure of a plurality of derivatives associated with the data strings, wherein each derivative of the plurality of derivatives is a different one of a plurality of behavioral language properties that measures a different one of a plurality of characteristics of one or more patterns among the plurality of data strings, and wherein the plurality of derivatives are inter-related with each other such that a weight of one of the plurality of derivatives is influenced by a weight of another of the plurality of derivatives;

an event recognition module; and a processor, configured to:
  look-up a most likely subsequent data string to follow an event recognized by the event recognition module from the set of the plurality of data strings based on the plurality of derivatives;
  output for display a list of the most likely subsequent data string in an order based on the priority indicator of the most likely data string on a display;
  select a required subsequent data string if it is included in the list;
  receive data entry, wherein the data entered comprises an event;
  update the priority indicator of any selected data string and the set of the plurality of data strings based on the updated priority indicator;
  wherein associative maps are maintained between data strings within two or more data dictionaries, the maps being used to dynamically infer associations between data strings based on map statistics, probabilities and analytics; and
  wherein a lookup chain is maintained between data dictionaries such that dynamic mapping can be made from one dictionary to another.

14. The mobile phone according to claim 13, wherein the plurality of derivatives comprise a plurality of etymological derivatives.

15. The mobile phone according to claim 13, wherein the derivatives include one or more of a timestamp, a cognitive coherence, a perceptual index, an associative index, a grammar orient, a correlative weight, an inference ratio and a pattern factorization.

16. The mobile phone according to claim 13, wherein the priority indicator is determined from qualitative and quantitative data related to each data string in the set.

17. The mobile phone according to claim 13, wherein the priority indicator includes one or more of the following:
  statistical information;
  probability information;
  data string analysis information;
  dictionary priority;
  dictionary chains;
  data string maps between other data strings; and
  data string translations.

18. The mobile phone according to claim 13, wherein the event includes one or more of a character, a graph, a multi-graph, a data string, a context, a symbol or any other user or machine generated input.

19. The mobile phone according to claim 13, wherein the set of the plurality of data strings in said dictionary includes a plurality of words, phrases and any other data string which might be used in the communication of a message.

20. The mobile phone according to claim 19, wherein data strings are added to the dictionary as they are entered by a user.

21. The mobile phone according to claim 13, wherein the priority indicators are updated dynamically in real-time.

22. The mobile phone according to claim 13, further comprising a lookup map between two or more data dictionaries such that a given data string in a first of said data dictionaries is mapped to a data string or strings in one or more other data dictionaries for selection by a user.

23. The mobile phone according to claim 22, wherein the processor is further configured to order a data string in a first data dictionary that is mapped to a plurality of data strings in one or more other data dictionaries based on the priority indicator to enable selection by a user.

24. The mobile phone according to claim 13, wherein the most likely subsequent data string are ordered based on the priority indicator to enable the user to select the required subsequent data string.

25. The mobile phone according to claim 13, wherein the processor is further configured to allow a user to selectively enable or disable physical interactivity reduction characteristics of an interface system which facilitate a reduction in a number of key presses required to create a data string.

26. The mobile phone according to 25, wherein the physical interactivity reduction characteristics are selected from the group comprising but not limited to:
  automatically entering a space after a selected data string;
  limitation of displayed mnemonics to those having a total number of characters greater than the number of key presses required to display said mnemonic on the data display means;
  automatically performing forward or backward translations between mnemonics or abbreviations or acronyms and their corresponding full data strings; and
  prioritization of the data strings created by any given data input key having multi-character indicia, said prioritization being based on selected qualitative and/or quantitative information relating to an initial character, which matches any of the indicia on the data, input key.

27. The mobile phone according to claim 13, wherein the plurality of derivatives comprise a plurality of ontological derivatives.

* * * * *